United States Patent
Tangari et al.

(10) Patent No.: US 12,475,325 B2
(45) Date of Patent: Nov. 18, 2025

(54) MODEL ROBUSTNESS ON OPERATORS AND TRIGGERING KEYWORDS IN NATURAL LANGUAGE TO A MEANING REPRESENTATION LANGUAGE SYSTEM

(71) Applicant: Oracle International Corporation, Redwood Shores, CA (US)

(72) Inventors: Gioacchino Tangari, Sydney (AU); Chang Xu, Sydney (AU); Nitika Mathur, Melbourne (AU); Philip Arthur, Sydney (AU); Syed Najam Abbas Zaidi, Melbourne (AU); Aashna Devang Kanuga, Foster City, CA (US); Cong Duy Vu Hoang, Wantima South (AU); Poorya Zaremoodi, Melbourne (AU); Thanh Long Duong, Seabrook (AU); Mark Edward Johnson, Sydney (AU); Vishal Vishnoi, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 98 days.

(21) Appl. No.: 18/505,498

(22) Filed: Nov. 9, 2023

(65) Prior Publication Data
US 2025/0156649 A1    May 15, 2025

(51) Int. Cl.
*G06F 40/289* (2020.01)
*G06F 40/211* (2020.01)
(Continued)

(52) U.S. Cl.
CPC ............ *G06F 40/40* (2020.01); *G06F 40/211* (2020.01); *G06F 40/284* (2020.01)

(58) Field of Classification Search
CPC .... G06N 3/096; G06N 3/0455; G06F 40/205; G06F 40/58
(Continued)

(56) References Cited

U.S. PATENT DOCUMENTS 12,141,134 B1 * 11/2024 Powar ................. G06F 16/2433
2008/0189289 A1 * 8/2008 Dettinger .............. G06F 16/288
(Continued)

OTHER PUBLICATIONS

Weir et al., "DBPal: A Fully Pluggable NL2SQL Training Pipeline", Research 26: Usability and Natural Language User Interfaces, Jun. 14-19, 2020, pp. 2347-2361.
(Continued)

*Primary Examiner* — Akwasi M Sarpong
(74) *Attorney, Agent, or Firm* — Kilpatrick Townsend & Stockton LLP

(57) ABSTRACT

Techniques are disclosed herein for improving model robustness on operators and triggering keywords in natural language to a meaning representation language system. The techniques include augmenting an original set of training data for a target robustness bucket by leveraging a combination of two training data generation techniques: (1) modification of existing training examples and (2) synthetic template-based example generation. The resulting set of augmented data examples from the two training data generation techniques are appended to the original set of training data to generate an augmented training data set and the augmented training data set is used to train a machine learning model to generate logical forms for utterances.

20 Claims, 14 Drawing Sheets

(51) Int. Cl.
  *G06F 40/284* (2020.01)
  *G06F 40/40* (2020.01)
  *G06N 3/08* (2023.01)
  *G10L 25/00* (2013.01)
(58) Field of Classification Search
  USPC .................... 704/9, 8, 257, 235, 275, 255
  See application file for complete search history.

(56) References Cited

U.S. PATENT DOCUMENTS

| | | | | |
|---|---|---|---|---|
| 2015/0178273 | A1* | 6/2015 | Hakkani-Tur | G06F 40/40 704/9 |
| 2017/0177715 | A1* | 6/2017 | Chang | G06N 5/04 |
| 2018/0314755 | A1 | 11/2018 | Curin | |
| 2021/0303555 | A1* | 9/2021 | Kim | G06F 16/90332 |
| 2021/0390951 | A1* | 12/2021 | Gadde | G10L 15/26 |
| 2022/0230000 | A1* | 7/2022 | Jalaluddin | G06F 40/295 |
| 2024/0185001 | A1* | 6/2024 | Nagaraju | G06F 40/284 |

OTHER PUBLICATIONS

Wang et al., "On Robustness of Prompt-based Semantic Parsing with Large Pre-trained Language Model: An Empirical Study on Codex", Proceedings of the 17th Conference of the European Chapter of the Association for Computational Linguistics, May 2-6, 2023, pp. 1090-1102.

Li et al., "On the Structural Generalization in Text-to-SQL", MoE Key Lab of Artificial Intelligence, AI Institute, Jan. 12, 2023, 13 pages.

Yu et al., "SyntaxSQLNet: Syntax Tree Networks for Complex and Cross-Domain Text-to-SQL Task", Department of Computer Science, Yale University, Oct. 25, 2018, 11 pages.

Wange et al., "Controllable Data Augmentation for Context-Dependent Text-to-SQL", Research Center for Social Computing and Information Retrieval, Apr. 27, 2023, 13 pages.

Zhekova et al., "Question patterns for natural language translation in SQL queries", ResearchGate, Jun. 2021, 19 pages.

Elgohary et al., "Speak to your Parser: Interactive Text-to-SQL with Natural Language Feedback", Proceedings of the 58th Annual Meeting of the Association for Computational Linguistics, Association for Computational Linguistics, Jul. 5-10, 2020, pp. 2065-2077.

Gan et al. "Towards Robustness of Text-to-SQL Models against Synonym Substitution", Proceedings of the 59th Annual Meeting of the Association for Computational Linguistics and the 11th International Joint Conference on Natural Language Processing, Association for Computational Linguistics, Aug. 1-6, 2021, pp. 2505-2515.

Prasad et al., "Enhancement of Natural Language to SQL Query Conversion using Machine Learning Techniques", Department of Computer Science and Engineering, RV College of Engineering, (IJACSA) International Journal of Advanced Computer Science and Applications, vol. 11, No. 12, 2020, pp. 494-503.

\* cited by examiner

MODEL ROBUSTNESS ON OPERATORS AND TRIGGERING KEYWORDS IN NATURAL LANGUAGE TO A MEANING REPRESENTATION LANGUAGE SYSTEM

FIELD

The present disclosure relates generally to transforming natural language to a logical form, and more particularly, to techniques for improving model robustness on operators and triggering keywords in natural language to a meaning representation language system.

BACKGROUND

Artificial intelligence has many applications. To illustrate, many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

Artificial intelligence-based solutions, such as chatbots, may have both analog (human) and digital (machine) interfaces for interacting with a human and connecting to a backend system. It is advantageous to be able to extract and analyze the meaning of an utterance (e.g., a request) when a human makes one using natural language, independent of how a backend system will handle the utterance. As an example, a request might be for data that needs to be retrieved from a relational database, or the requested data might need to be extracted from a knowledge graph. A MRL is a versatile representation of a natural language utterance that a chatbot can translate into any number of target machine-oriented languages. As such, an MRL can be utilized by a chatbot to communicate interchangeably with both a human and various backend systems, including systems that communicate using Structured Query Language (SQL), Application Programming Interfaces (APIs), REpresentational State Transfer (REST), Graph Query Language (GraphQL), Property Graph Query Language (PGQL), etc.

For example, SQL is a standard database management language for interacting with relational databases. SQL can be used for storing, manipulating, retrieving, and/or otherwise managing data held in a relational database management system (RDBMS) and/or for stream processing in a relational data stream management system (RDSMS). SQL includes statements or commands that are used to interact with relational databases. SQL statements or commands are classified into, among others, data query language (DQL) statements, data definition language (DDL) statements, data control language (DCL) statements, and data manipulation language (DML) statements. To interact with relational databases using SQL, users must know how the database is structured (e.g., knowledge of the tables and rows and columns within each table), SQL syntax, and how to relate the syntax to the database structure. Without this knowledge, users often have difficultly using SQL to interact with these relational databases.

Natural language interfaces (e.g., chatbots) to databases systems (NLIDB) such as RDBMS provide users with a means to interact with these relational databases in an intuitive way without requiring knowledge of a database management language. For example, using natural language statement and queries (i.e., natural language querying), users can interact with these relational databases, via a NLIDB, with plain language. Recently, text-to-SQL systems have become popular and deep learning approaches to converting natural language queries to SQL queries have proved promising. Using semantic parsing, natural language statements, requests, and questions (i.e., sentences) can be transformed into machine-oriented language that can be executed by an application (e.g., chatbot, model, program, machine, etc.). For example, semantic parsing can transform natural language sentences into general purpose programming languages such as Python, Java, and SQL. Processes for transforming natural language sentences to SQL queries typically include rule-based, statistical-based, and/or deep learning-based systems. Rule-based systems typically use a series of fixed rules to translate the natural language sentences to SQL queries. These rule-based systems are generally domain-specific and, thus, are considered inelastic and do not generalize well to new use cases (e.g., across different domains). Statistical-based systems, such as slot-filling, label tokens (i.e., words or phrases) in an input natural language sentence according to their semantic role in the sentence and use the labels to fill slots in the SQL query. Generally, these statistical-based systems have limitations on the types of sentences that can be parsed (e.g., a sentence must be able to be represented as a parse tree). Deep-learning based systems, such as sequence-to-sequence models, involve training deep-learning models that directly translate the natural language sentences to machine-oriented languages and have been shown to generalize across tasks, domains, and datasets. However, such deep-learning systems require a large amount of training data for supervised learning, and it is challenging to obtain labelled data (e.g., natural language query-SQL statement pairings). Thus, translating natural language sentences to machine-oriented languages based on deep-learning cannot avoid the need for a large amount of labelled training data.

BRIEF SUMMARY

Machine learning techniques are provided (e.g., a method, a system, non-transitory computer-readable medium storing code or instructions executable by one or more processors) for improving model robustness on operators and triggering keywords in natural language to a meaning representation language system such as OMRL (e.g., Oracle Meaning Representation Language (OMRL)).

In various embodiments, a computer-implemented method is provided that comprises: accessing training data comprising a plurality of training examples comprising a first training example, where the first training example comprises a first natural language utterance and a first logical form for the first natural language utterance, and where the first natural language utterance comprises one or more keywords associated with a target robustness bucket;

replacing, in the first natural language utterance, the one or more keywords with one or more replacement terms sampled from a list of replacement terms to generate a second natural language utterance; generating a second training example comprising the second natural language utterance and the first logical form; accessing a data manufacturing template that defines structure of a system operation and constraints imposed on operators of the system operation; generating a second logical form by filling slots for one or more of the operators in the data manufacturing template based on a schema and values for a system, where the one or more of the operators are associated with the target robustness bucket; translating the second logical form into a third natural language utterance based on a grammar data structure that includes a custom grammar and a set of rules for translating logical form statements into corresponding natural language expressions comprising one or more target keywords, where the custom grammar comprises target keywords including the replacement terms from the list of replacement terms, which are used to control the translating such that natural language utterances will contain one or more of the target keywords; generating a third training example comprising the second logical form and the third natural language utterance; augmenting the training data by adding the second training example and the third training example to the plurality of training examples to generate an augmented training data set; and training a machine learning model to generate logical forms for utterances using the augmented training data set.

In some embodiments, accessing the training data comprises identifying, from the plurality of training examples, a set of target training examples that match patterns comprising the one or more keywords or the one or more of the operators associated with the target robustness bucket, where the set of target training examples comprise the first training example.

In some embodiments, the first training example comprises the first natural language utterance, the first logical form for the first natural language utterance, and metadata associated with the first natural language utterance, wherein generating the second training example comprises modifying the metadata associated with the first natural language utterance to generate updated metadata associated with the second natural language utterance, and wherein modifying the metadata comprises adjusting an offset value for schema linking to reflect values in the second natural language utterance.

In some embodiments, the data manufacturing template comprises a delexicalized version of the second logical form and filling the slots comprises: parsing the data manufacturing template, sampling the system and schema to identify a plurality of sampling components comprising the values, and lexicalizing the slots of the data manufacturing template with at least one sampling component of the plurality of sampling components.

In some embodiments, the data manufacturing template is parsed by applying a synchronous context-free grammar to the delexicalized version of the second logical form to generate an abstract syntax tree for the data manufacturing template, and lexicalizing the data manufacturing template comprises analyzing the data manufacturing template to identify the constraints imposed on the operators and lexicalizing the slots of the data manufacturing template with at least one sampling component of the plurality of sampling components based on the identified constraints.

In some embodiments, translating the second logical form into a third natural language utterance comprises: converting the second logical form into a logical form structure comprising one or more logical form statements, wherein the converting comprises extracting one or more operations and associated one or more attributes from the second logical form and generating the one or more logical form statements from the one or more operations and associated one or more attributes; translating each of the one or more logical form statements into a natural language expression based on the grammar data structure; combining the one or more natural language expressions into the third natural language utterance; and providing third natural language utterance as an interpretation of the second logical form.

In some embodiments, training the machine learning model using the augmented training data set comprises: sampling training values from the augmented training data set based on a sampling rate; and training the machine learning model using the sampled training values.

In various embodiments, a system is provided that includes one or more processors and one or more computer-readable media storing instructions which, when executed by the one or more processors, cause the system to perform part or all of the operations and/or methods disclosed herein.

In various embodiments, one or more non-transitory computer-readable media are provided for storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
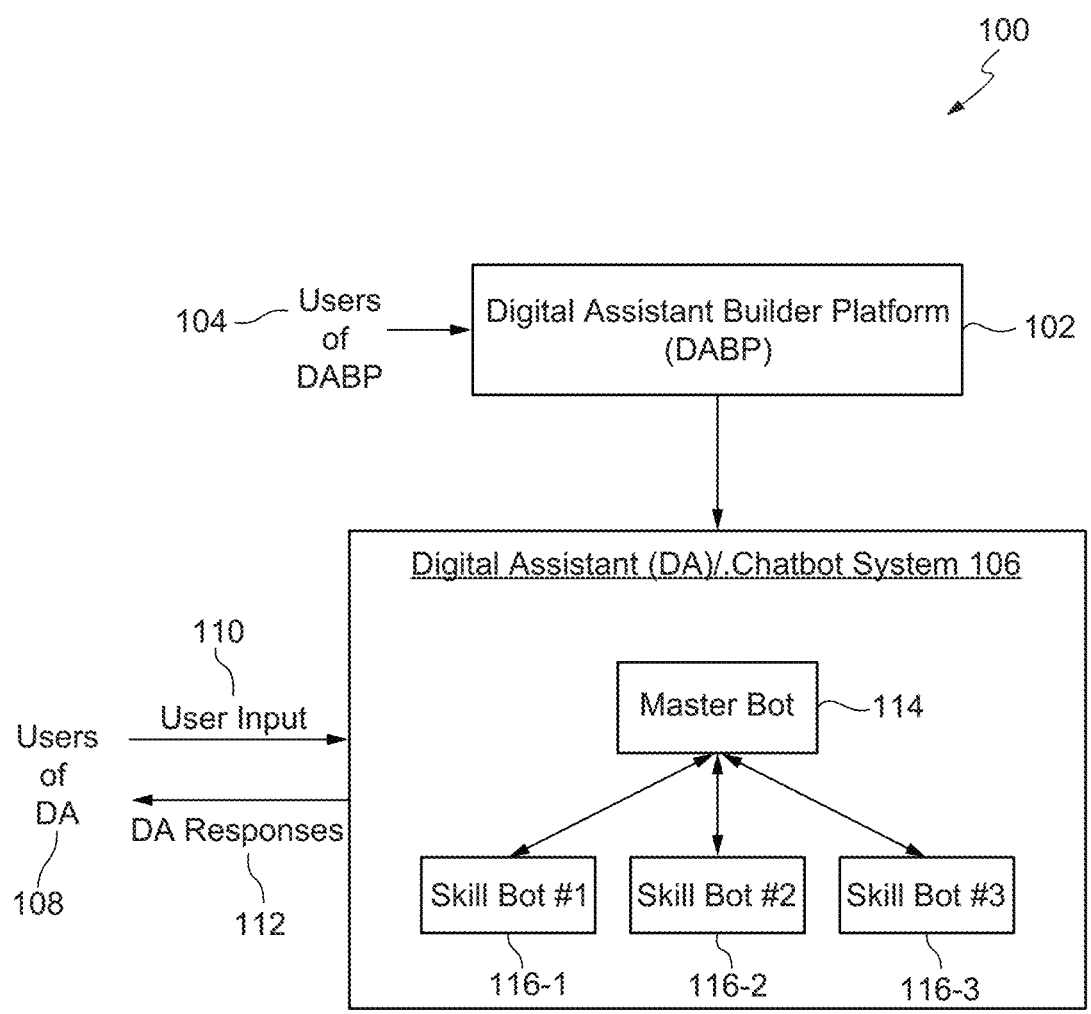
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

In recent years, the amount of data powering different industries and their systems has been increasing exponentially. A majority of business information is stored in the form of relational databases that store, process, and retrieve data. Databases power information systems across multiple industries, for instance, consumer tech (e.g., orders, cancellations, refunds), supply chain (e.g., raw materials, stocks, vendors), healthcare (e.g., medical records), finance (e.g., financial business metrics), customer support, search engines, and much more. It is imperative for modern data-driven companies to track the real-time state of its business in order to quickly understand and diagnose any emerging issues, trends, or anomalies in the data and take immediate corrective actions. This work is usually performed manually by analysts who compose complex queries in query languages (e.g., database query languages such as declarative query languages) like SQL, PGQL, logical database queries, API query languages such as GraphQL, REST, and so forth. Composing such queries can be used to derive insightful information from data stored in multiple tables. These results are typically processed in the form of charts or graphs to enable users to quickly visualize the results and facilitate data-driven decision making.

Although common database queries (e.g., SQL queries) are often predefined and incorporated in commercial products, any new or follow-up queries still need to be manually coded by the analysts. Such static interactions between database queries and consumption of the corresponding results require time-consuming manual intervention and result in slow feedback cycles. It is vastly more efficient to have non-technical users (e.g., business leaders, doctors, or other users of the data) directly interact with the analytics tables via natural language (NL) queries that abstract away the underlying query language (e.g., SQL) code. Defining the database query requires a strong understanding of database schema and query language syntax and can quickly get overwhelming for beginners and non-technical stakeholders. Efforts to bridge this communication gap have led to the development of a new type of processing called NLIDB. This natural search capability has become more popular over recent years as companies are developing deep-learning approaches for natural language to logical form (NL2LF) such as natural language to SQL (NL2SQL). In the present context, logical form of a natural language statement or utterance is a precisely specified semantic version of that statement or utterance in a formal system such as meaning representation languages (MRL) and/or machine-oriented languages (e.g., SQL or PGQL). NL2SQL seeks to transform natural language questions to SQL, allowing individuals to run unstructured queries against databases. The converted SQL could also enable digital assistants such as chatbots and others to improve their responses when the answer can be found in different databases or tables.

In the specific context of converting NL to a meaning representation language, a NL utterance (e.g., a user's question) is typically provided to a NL2LF model, which converts the NL utterance into a logical form, for example, an intermediate database query language such as Oracle Meaning Representation Query Language (OMRQL)—referred to herein as Oracle Meaning Representation Language (OMRL). The NL2LF model is a machine learning model trained to generate intermediate representations from NL utterances. The intermediate representation can then be translated to one or more desired query formats, such as SQL or PGQL using a translation process. Thereafter, the NL utterance in the desired query format may be executed on a system such as database to obtain data relevant to the query and formulate a response to the NL utterance (e.g., an answer to the user's question) for review by a user.

A challenge with deep-learning approaches for NL2LF is that they require an enormous amount of training data in order to build accurate models. For example, the conversation-to-Oracle Meaning Representation Language (C2OMRL)) deep-learning model (referred to herein as the "semantic parser", "C2OMRL semantic parser" or "C2OMRL model") is trained with general-domain datasets in the order of thousands of examples. However, the NL2LF model may still show high error rates when the input utterances include keywords, phrasings, constructs that are present only in few training examples or totally absent in the model training sets. Conventional approaches have either ignored this problem and assumed the availability of large, manually curated training datasets (e.g., using crowd sourcing to generate NL and LF pairs of data) or manually craft additional training examples for any of the under-represented cases. In most cases, however, gathering and manually crafting data is a substantial undertaking that requires a significant amount of time, effort, and money.

Accordingly, different approaches are needed to address these challenges and others. The approaches described herein implement a framework to improve the semantic parser robustness by (semi-) automatically generating additional training examples in a desired robustness "bucket" (i.e., tailored to underrepresentation of different terms) and then re-training the semantic parser based on the augmented training data. The additional training examples are generated in a desired robustness "bucket" using the following two techniques: (i) augmentation of existing training examples, and (ii) synthetic template-based example generation.

For example, in at least one approach, a computer-implemented method is provided that includes: accessing training data comprising a plurality of training examples comprising a first training example, where the first training example comprises a first natural language utterance and a first logical form for the first natural language utterance, and where the first natural language utterance comprises one or more keywords associated with a target robustness bucket; replacing, in the first natural language utterance, the one or more keywords with one or more replacement terms sampled from a list of replacement terms to generate a second natural language utterance; generating a second training example comprising the second natural language utterance and the first logical form; accessing a data manufacturing template that defines structure of a system operation and constraints imposed on operators of the system operation; generating a second logical form by filling slots for one or more of the operators in the data manufacturing template based on a schema and values for a system, where the one or more of the operators are associated with the target robustness bucket; translating the second logical form into a third natural language utterance based on a grammar data structure that includes a custom grammar and a set of rules for translating logical form statements into corresponding natural language expressions comprising one or more target keywords, where the custom grammar comprises target keywords including the replacement terms from the list of replacement terms, which are used to control the translating such that natural language utterances will contain one or more of the target keywords; generating a third training example comprising the second logical form and the third natural language utterance; augmenting the training data by adding the second training example and the third training example to the plurality of training examples to generate an augmented training data set; and training a machine learning model to generate logical forms for utterances using the augmented training data set.

As used herein, when an action is "based on" something, this means the action is based at least in part on at least a part of the something. As used herein, the terms "similarly", "substantially," "approximately" and "about" are defined as being largely but not necessarily wholly what is specified (and include wholly what is specified) as understood by one of ordinary skill in the art. In any disclosed embodiment, the term "similarly", "substantially," "approximately," or "about" may be substituted with "within [a percentage] of" what is specified, where the percentage includes 0.1, 1, 5, and 10 percent.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some instances, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some instances, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some instances, the bot system may convert the content into a standardized form (e.g., a representational state transfer (REST) call against enterprise services with the proper parameters) and generate a natural language response. The bot system may also prompt the end user for additional input parameters or request other additional information. In some instances, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some instances, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can be communicated by various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some instances, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some instances, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some instances, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot
Each of the above steps is briefly described below.

(1) Configuring settings for a new skill bot-Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot-A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
  (a) a context section
  (b) a default transitions section
  (c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section-A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one or more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot-DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
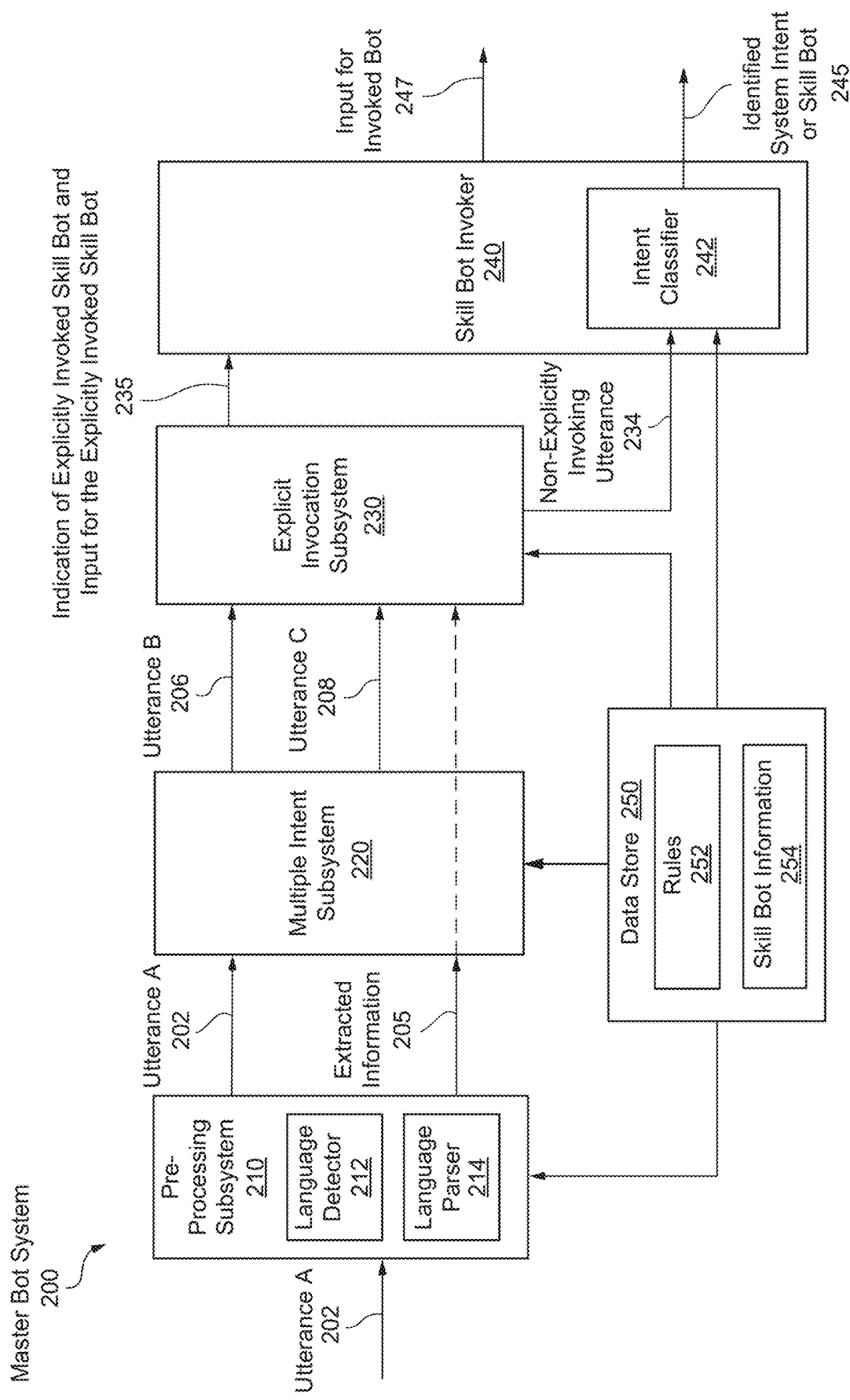
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit_card." Language parser 214 may also identify relationships between the words in the utterance 202. For example, In some instances, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
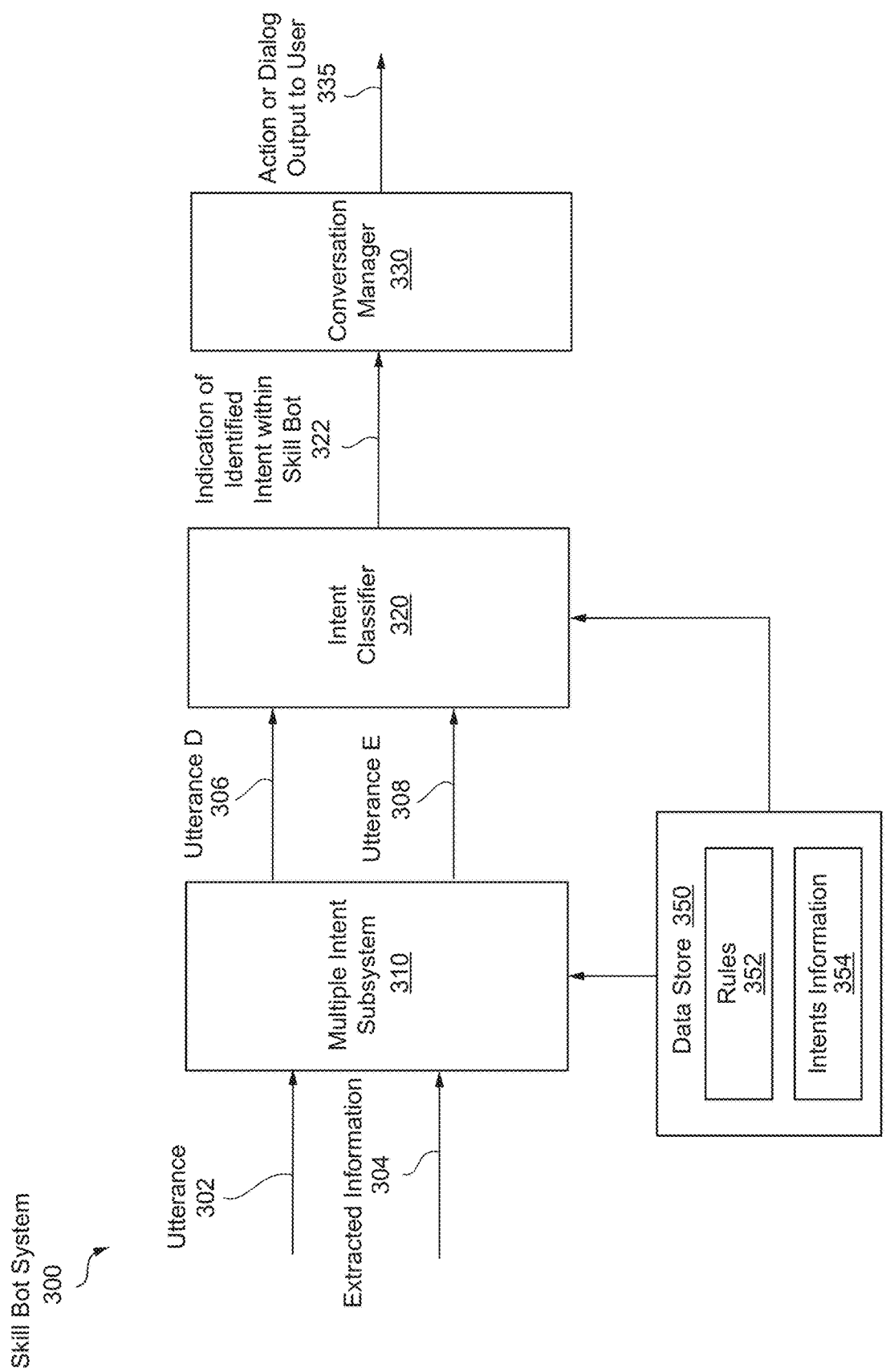
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine learning model) can be stored as part of skill bot information 254.

In certain embodiments, the intent classifier 242 is implemented using a machine learning model, as described in further detail herein. Training of the machine learning model may involve inputting at least a subset of utterances from the example utterances associated with various skill bots to generate, as an output of the machine learning model, inferences as to which bot is the correct bot for handling any particular training utterance. For each training utterance, an indication of the correct bot to use for the training utterance may be provided as ground truth information. The behavior of the machine learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some instances, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine learning model. The machine learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

System for Translating Natural Language to Meaning Representation Language

Figure 4:
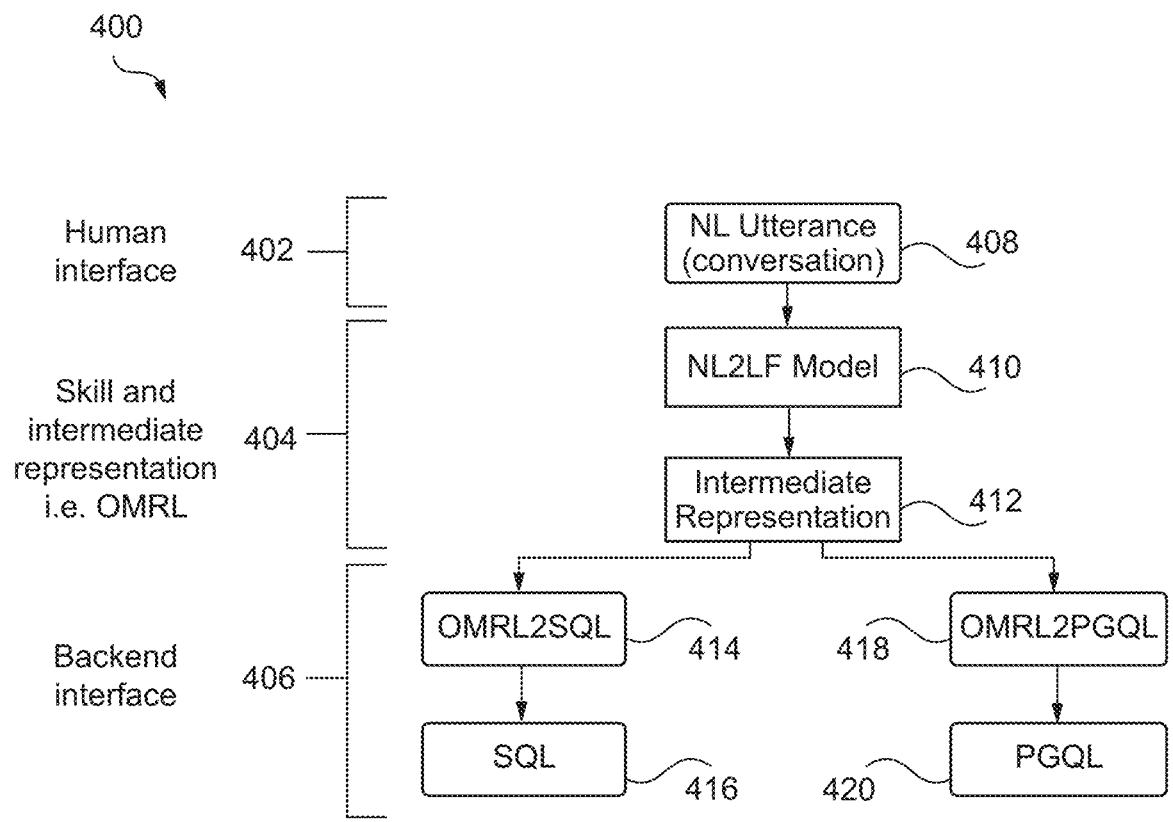
FIG. 4 is a simplified block diagram illustrating an overview of a NL2LF or C2MRL architecture and process for generating a query for a backend interface starting with a natural language utterance, in accordance with various embodiments.

A NL2LF system or a conversation to MRL (C2MRL such as conversation-to-Oracle Meaning Representation Language (C2OMRL)) system is powered by a deep learning model configured to convert a natural language (NL) utterance (e.g., a query posed by a user using a digital assistant or chatbot) into a logical form, for example, an intermediate database query language such as Oracle Meaning Representation Language (OMRL). The logical form can be used to generate a query in a specific system query language (e.g., SQL), which can then be executed for querying a system such as a database to obtain an answer to the user's utterance. FIG. 4 is a block diagram 400 illustrating an overview of a C2MRL architecture and process for generating a query for a backend interface 406 starting with a NL utterance 408, e.g., as received via a human interface 402. For example, the human interface 402 can be a chatbot system that receives spoken speech and translates it to a text utterance, as described above, or a system where a user types in a request in natural language, or other suitable interfaces. The NL utterance 408 can be in the form of part of a conversation (e.g., "Hello, can you tell me how many orders we need to send out tomorrow?" or "Search for all employees with first name starting with 'S' and living in California.").

The NL utterance 408 is provided to a NL2LF model 410, which converts the NL utterance 408 to an intermediate representation 412 (e.g., MRL or OMRL). The NL2LF model 410 is a machine learning model trained to generate intermediate representations 412 from NL utterances 408. The NL2LF model 410 includes multiple layers and algorithms for generating intermediate representations 412 from NL utterances 408, as described herein in further detail. In some instances, as depicted in FIG. 4, the NL2LF model 410 is a C2OMRL model for converting a conversational utterance to OMRL 412. The NL2LF model 410 may be described interchangeably herein with C2OMRL, although it should be understood that the techniques described herein can be applied to models configured to generate other intermediate representation 412 formats. The intermediate representation 412 is a logical representation of the utterance, which is configured to be translatable into a specific system query language. In some examples, the intermediate representation 412 is OMRL, an intermediate database query language with a specialized schema and interface specification. The intermediate representation 412 may be described interchangeably herein with OMRL, although it should be understood that the techniques described herein can be applied to other intermediate representation 412 formats.

The intermediate representation 412 can then be translated to one or more desired system query languages, such as SQL 416 or PGQL 420, using one or more system language translation processes, such as an OMRL2SQL 414 translation process or an OMRL2PGQL 418 translation process. The translated query (e.g., SQL 416 or PGQL 420) represents the concepts that are present in intermediate representation 412 in a manner that conforms to the requirements of the applicable system query language.

Figure 5:
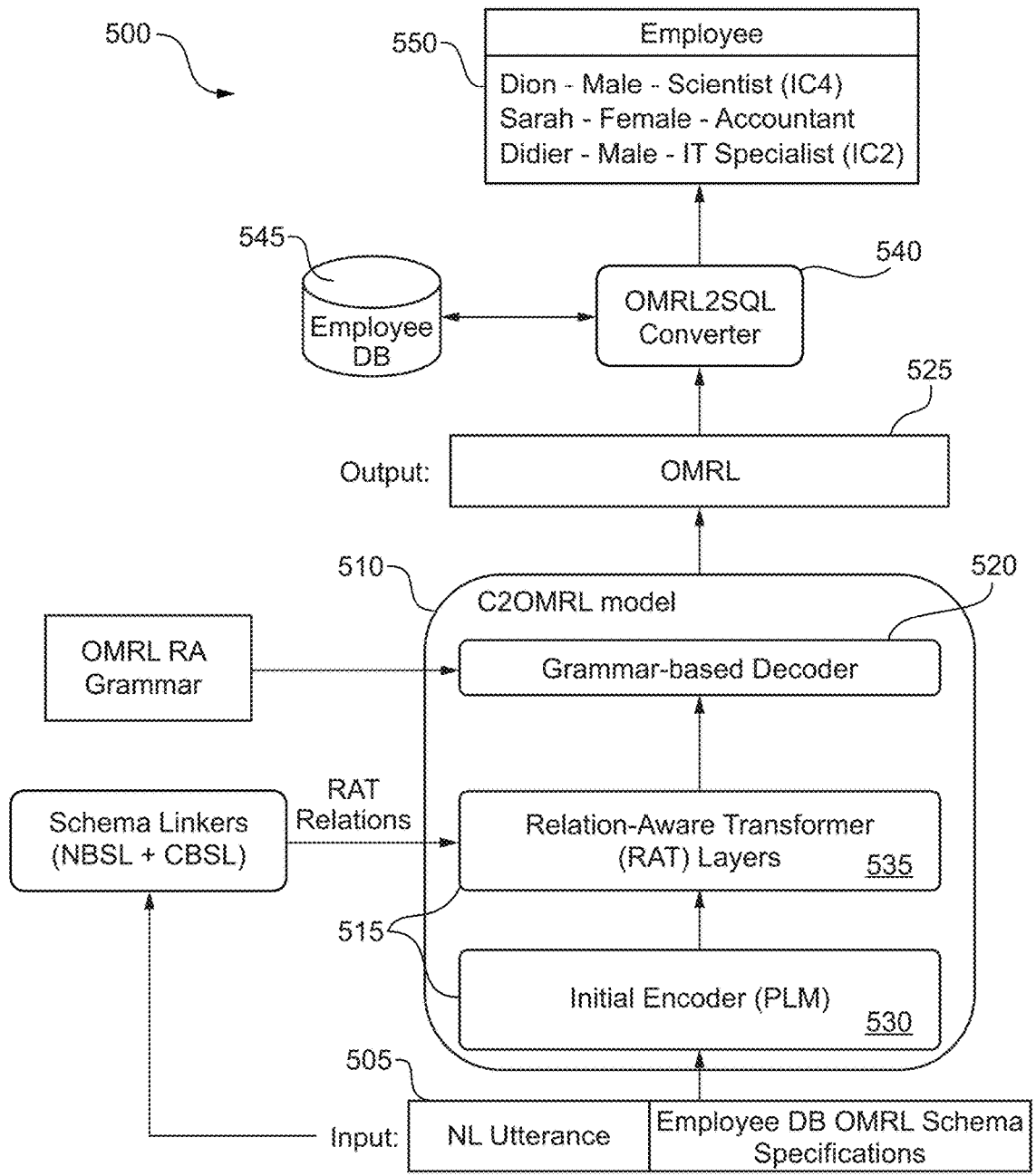
FIG. 5 is a simplified block diagram of a C2OMRL architecture in accordance with various embodiments.

FIG. 5 shows a C2OMRL system 500 powered by a machine learning model to be able to convert a NL utterance (e.g., an utterance within the Digital Assistant platform as described with respect to FIGS. 1-3) into a LF statement such as OMRL query or command, which in turn can be executed for querying an existing system such as a relational database. This machine learning model (referred to herein as the "C2OMRL semantic parser" or "C2OMRL model" or simply "parser") is trained on hundreds to thousands of annotated example pairs (natural language and logical form pairs) for translating NL utterance into a LF statement. As shown, an example 505 (concatenation of a natural language utterance and the database schema, e.g., sequence of table and column names) is input into the C2OMRL model 510. The example 505 is first processed by the encoder component 515, which captures the representation of the natural language utterance and the database schema contextually. The decoder 520 then receives the encoded input and predicts the logical form 525 (e.g., OMRL, which is a SQL-like query) based on the captured representation of the natural language utterance and the database schema.

In the C2OMRL model 510, the encoder component 515 includes two encoders (1) a first encoder, which is a Pre-trained Language Model (PLM) 530; and (2) a second encoder, which is a Relation-Aware Transformer (RAT) 535. The PLM 530 is used to embed the natural language utterance and database schema, as it captures a representation of the natural language utterance and the database schema contextually. In certain instances, a transformer-based PLM called Decoding-enhanced BERT with disentangled attention (DeBERTa) is used as the PLM 530. (See He et al., DeBERTaV3: Improving DeBERTa using ELECTRA-Style Pre-Training with Gradient-Disentangled Embedding Sharing (2021), the entire contents of which are hereby incorporated by reference for all purposes). Transformer-based PLMs learn universal language representations from large volumes of text data using self-supervised learning and transfer this knowledge to downstream tasks. These models provide good background knowledge to downstream tasks which avoids training of downstream models from scratch. The RAT 535 encodes the relations between entities in the database schema and words in the natural language utterance (these relations are called "schema linking" relations).

The decoder 520 is based on a bottom-up generative process (i.e., the bottom-up generative process generates a tree from left to right), where the final generation output is a OMRL tree (i.e., a tree-based structure that represents the full OMRL logical form) that can be mapped to a final OMRL logical form 525. The bottom-up generative process is implemented using a beam search, which is a heuristic search algorithm that explores a graph by expanding the most promising node in a limited set. The beam search works in steps (e.g., ~10 steps), also called "beam levels". At each step (e.g., "step i"), the beam search algorithm generates a number F of possible sub-trees for an input sequence that can be obtained by extending the current sub-trees (from step "i−1"), and then selects the top-K sub-trees (known as beam width) for retention using the conditional probability associated with each sub-tree. The conditional probability is referred to herein as a "raw beam score", and thus the top-K intermediate results (to be considered in the next generative step) are the K ones with the highest raw beam scores. Additional information for the bottom-up generative process is found in "Ohad Rubin and Jonathan Berant. 2021. SmBoP: Semi-autoregressive Bottom-up Semantic Parsing, in Proceedings of the 2021 Conference of the North American Chapter of the Association for Computational Linguistics: Human Language Technologies, pages 311-324, Online. Association for Computational Linguistics," the entire contents of which are hereby incorporated by reference for all purposes. The final decoder 520 output is the sub-tree with the highest raw beam score at the last step N.

For example, at a first step (beam level 1), the encoded input utterance and database schema are input to the decoder 520 and the decoder 520 will apply a softmax function to all the tokens in a vocabulary or grammar to find the best alternatives for a first sub-tree (e.g., a first token or node of a tree). To generate the number F of possible sub-trees (known as the frontier), the decoder 520 makes predictions representing the conditional probability of each token in the vocabulary or grammar coming next in a sequence (the likely value of $y_{i+1}$, conditioned on the previous tokens $y_1, \ldots, y_i$ and the context variable c, produced by the encoder to represent the input sequence). The vocabulary or grammar is obtained from a corpus comprising words or terms in the target logical form (e.g., OMRL). In certain instances, the corpus further comprises rules for the words or terms in the target logical form. The rules define how the words or terms may be used to create a proper phrase or operation in the target logical form (e.g., the combination of terms that work together for a proper OMRL query). The beam search algorithm then selects the top-K sub-trees with the highest conditional probability or raw beam score as the most likely possible choices for the time step. In this example, suppose the top-K sub-trees or beam width is 2 and that the sub-trees with the highest conditional probabilities $P(y_1|c)$ in the first step are sub-tree_1 and sub-tree_12. The top-K results can be a selectable and/or optimizable hyperparameter. Sub-tree_1 and sub-tree_12 and the corresponding conditional probabilities or raw beam scores are saved in memory.

At a second step (beam level 2), the two selected trees (sub-tree_1 and sub-tree_12) from the first step are input to the decoder 520 and the decoder 520 will apply the softmax function to all the tokens in the vocabulary or grammar to find the two best alternatives for the second sub-tree (e.g., a first and second token or node of a tree). While doing this, the beam search algorithm will determine the combination of the first and second tokens or nodes that are most likely to form a pair or second sub-tree using the conditional probabilities. In other words, for all $y_2 \in Y$, the beam search algorithm computes $P(\text{sub-tree\_1}, y_2|c) = P(\text{sub-tree\_1}|c) P(y_2|\text{sub-tree\_1}, c)$, $P(\text{sub-tree\_12}, y_2|c) = P(\text{sub-tree\_12}|c) P(y_2|\text{sub-tree\_12}, c)$, and select the largest two among these values, for example $P(\text{sub-tree\_22}|c)$ and $P(\text{sub-tree\_37}|c)$. Sub-tree_22 and sub-tree_37 and the corresponding conditional probabilities or raw beam scores are saved in memory.

At a third step (beam level 3), the two selected trees (sub-tree_22 and sub-tree_37) from the second step are input to the decoder 520 and the decoder 520 will apply the softmax function to all the tokens in the vocabulary or grammar to find the two best alternatives for the third sub-tree (e.g., a first, second, and third token or node of a tree). While doing this, the beam search algorithm will determine the combination of the first, second, and third tokens or nodes that are most likely to form a string or third sub-tree using the conditional probabilities. In other words, for all $y_3 \in Y$, the beam search algorithm computes $P(\text{sub-tree\_22}, y_3|c) = P(\text{sub-tree\_22}|c) P(y_3|\text{sub-tree\_22}, c)$, $P(\text{sub-tree\_37}, y_3|c) = P(\text{sub-tree\_37}|c) P(y_3|\text{sub-tree\_37}, c)$, and select the top-K sub-trees. The top-K sub-trees and the corresponding conditional probabilities or raw beam scores are saved in memory. This process continues until N number of beam levels is completed (this could be an optimized or selected hyperparameter). The final model output is the sub-tree with the highest conditional probability or raw beam score at the last step N (beam level N). The tokens or nodes of this final sub-tree can then be mapped to a final logical form such as OMRL logical form statement 525.

The predicted MRL logical form statement 525 (i.e., the OMRL tree with the highest raw beam score at the last step N) can then be input into a language converter 540 such as (OMRL2SQL) to translate the meaning representation language to a systems language query or command such as SQL, APIs, REST, GraphQL, PGQL, etc. The systems language query or command can then be used to query or execute an operation on a system 545 (e.g., a relational database) and obtain an output 550 as a result of the query or command.

Figure 6:
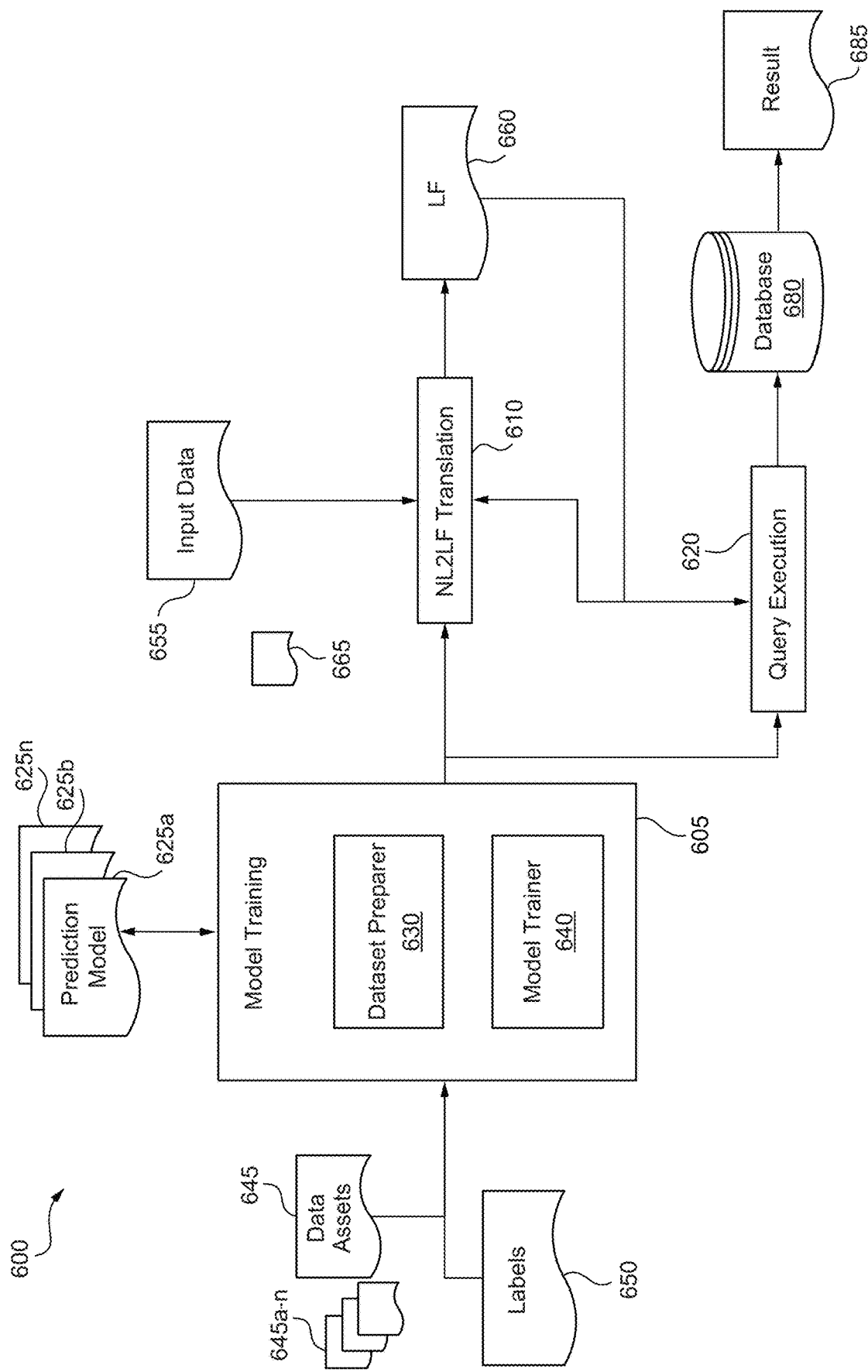
FIG. 6 illustrates a model system for training and deploying models in accordance with various embodiments.

FIG. 6 shows a block diagram illustrating aspects of a model system 600 configured to for training and deploying machine learning models (e.g., the NL2LF machine learning model described with respect to FIGS. 4-5). The model system 600 in this example includes various subsystems: a training subsystem 605 to train machine learning models, a NL2LF translation subsystem 610 to translate natural language text (e.g., an utterance) to a logical form such as OMRL, and a query execution subsystem 620 to execute the logical form on a system such as database to obtain a result (e.g., an answer to a query within an utterance). The training subsystem 605 builds and trains one or more machine learning models 625a-625n ('n' represents any natural number) to be used by the other subsystems (which may be referred to herein individually as a model 625 or collectively as the models 625). For example, the models 625 can include a first model for translating a natural language utterance to a logical form in an intermediate database query language and a second model for translating the logical form to a particular database query language. Still other types of prediction models (e.g., an intent classifier) may be implemented in other examples according to this disclosure.

In some instances, a model 625 is configured as a sematic parser or NL2LF model such as RAT-SQL (as encoders) in combination with a Semi-autoregressive Bottom-up Semantic Parsing model (SMBOP) (as decoder). Additional information for the RAT-SQL model is found in "RAT-SQL: Relation-Aware Schema Encoding and Linking for Text-to-SQL Parsers" by Wang et al., published in Proceedings of the 58th Annual Meeting of the Association for Computational Linguistics, the entire contents of which are hereby incorporated by reference for all purposes. Additional information for the SMBOP model is found in Ohad Rubin and Jonathan Berant. 2021. "SmBoP: Semi-autoregressive Bottom-up Semantic Parsing." In Proceedings of the 2021

Conference of the North American Chapter of the Association for Computational Linguistics: Human Language Technologies, pages 311-324, Online. Association for Computational Linguistics, the entire contents of which are hereby incorporated by reference for all purposes.

To train the various models 625, the training subsystem 605 is comprised of two main subsystems or services: dataset preparer 630 and model trainer 640. The dataset preparer 630 facilitates the process of loading data assets 645, splitting the data assets 645 into training and validation sets (645-*a*-*n*) so that the system can train and test the models 625, and performing basic natural language pre-processing (e.g., standardization, normalization, tokenizing data, etc.) and augmentation as described in detail herein. The data assets 645 include natural language utterances (e.g., natural language questions/requests) as inputs and OMRL logical forms as outputs, obtained from one or more sources such as from human annotators and/or databases (not shown). In some instances, the utterances are provided by a client or customer. In other instances, the utterances are automatically generated and/or retrieved from libraries of utterances (e.g., identifying utterances from a library that are specific to a task that a model is to learn). The data assets 645 can include input text or audio (or input features of text or audio frames) and labels 650 corresponding to the input text or audio (or input features) as a matrix or table of values. For example, for each utterance, a corresponding label may comprise an indication of the corresponding logical form (e.g., statements/queries such as OMRL queries) and/or an indication of whether the logical form was correct or incorrect for the utterance provided as ground truth information for the utterance. The behavior of the model can then be adapted (e.g., through back-propagation) to minimize the difference between the generated inferences and the ground truth information. For example, the data assets 645 can include the natural language utterance "What is the average life expectancy in the United States of America?" and a label including the corresponding logical form "SELECT AVG (life_expectancy) FROM country=United States of America" (and in some instances whether the predicted logical form was "correct" or "incorrect").

In some instances, the data assets 645 also include database schema information. A database schema defines how data is organized within a database such as a relational database; this includes logical constraints such as table names, fields, data types, and the relationships between these entities. A relational database can be formed of one or more tables with each table of the one or more tables including one or more columns with each column of the one or more columns including one or more values. Each table and column of a relational database can be named with unique identifiers, each of which can include one or more words. In some instances, one or more columns of the relational database may serve as a primary key in which each of the values of the one or more columns that serve as the primary key are unique from each other. In some instances, one or more columns of the relational database may serve as a foreign key which serves to the link the table which includes the one or more columns with another table in the relational database. In some instances, the database schema information includes one or more data structures for storing the unique identifiers of the one or more tables, the unique identifiers of the one or more columns, and values of each relational database. The unique identifiers and values can be stored by the dataset preparer 630 in one or more vectors and/or matrices. In some instances, a data structure storing schema information for a relational database can store a directed graph representing the unique identifiers and values.

Once the data assets 645 are obtained, the datasets may be split into training and validation datasets. The splitting may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting. Before or after splitting, basic natural language pre-processing may be performed on the data assets 645. In some instances, the pre-processing includes tokenizing the utterances of the data assets 645. Tokenizing is splitting a phrase, sentence, paragraph, or an entire text document into smaller units, such as individual words or terms. Each of these smaller units are called tokens. Smaller units are created by locating boundaries such as word boundaries, which are the ending point of a word and the beginning of the next word. For example, the text "How many employees work for company X" can be word tokenized into 'How', 'many', 'employees', 'work', 'for', 'company', 'X'. These tokens help the model to understand the context and develop the model for a given task. There are various tokenization techniques which can be used for executing the tokenizing based on the language and modeling task. For example, the tokenizing may be performed using Natural Language ToolKit, white space tokenization, dictionary-based tokenization, rule-based tokenization, Keras tokenization, Penn Tree based tokenization, spaCy tokenization, Moses tokenization, subword tokenization, or the like.

In some instances, the tokens for data assets 645 may then be embedded to word embeddings (e.g., contextualized word embeddings). A word embedding is a learned representation for text where words that have the same meaning have a similar representation. Word embeddings are generated by embedding techniques where individual words are represented as real-valued vectors in a predefined vector space so they can be understood by deep learning algorithms. The embedding techniques can be joint or individual embedding techniques such as including an embedding layer within the deep learning algorithm or using a separate model such as a BERT-based pretrained language model (e.g., BERT, ROBERTa, and DeBERTa). BERT-based models are pretrained language models that use self-supervised learning to learn the deep meaning of words and contexts. An embedding layer is a word embedding that is learned jointly with a neural network model on a specific natural language processing task, such as the natural language to logical form translation (e.g., the natural language-logical form (NL2LF) algorithm(s)).

The model training generally includes selecting hyperparameters for the model 625 and using an optimization algorithm (e.g., a stochastic gradient descent algorithm or a variant thereof such as batch gradient descent or minibatch gradient descent) to find the model parameters that correspond to the best fit between predicted and actual outputs. The hyperparameters are settings that can be tuned or optimized to control the behavior of the model 625. Most models explicitly define hyperparameters that control different aspects of the models such as memory or cost of execution. However, additional hyperparameters may be defined and optimized to adapt a model to a specific scenario. For example, the hyperparameters may include the number of hidden units of a model, the learning rate of a model, the convolution kernel width, the number of kernels for a model, the top-K results, N number of beam levels, and the like.

During training by the model trainer 640, error is calculated as the difference between the actual output (e.g., as indicated by the label 650) and the predicted output (e.g., as determined by the model 625). The function that is used to compute this error is known as an objective function (e.g., a loss function or a cost function). Error is a function of internal parameters of the model, e.g., weights and bias. For accurate predictions, the error needs to be minimized. In order to minimize the error, the model parameters are incrementally updated by minimizing the objective function over the training examples from preprocessed data assets 645. The objective function can be constructed to measure the difference between the outputs inferred using the models and the ground truth annotated to the samples using the labels. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some machine learning algorithms such as a neural network, this is done using back propagation. The current error is typically propagated backwards to a previous layer, where it is used to modify the weights and bias values in such a way that the error is minimized. The weights are modified using the optimization function. Optimization functions usually calculate the error gradient, i.e., the partial derivative of the objective function with respect to weights, and the weights are modified in the opposite direction of the calculated error gradient. Here, stochastic gradient descent (SGD) optimization and back propagation techniques are used to update the model parameters in such a manner as to minimize the defined objective function. In some aspects, adaptive optimization techniques such as Adam are used for that purpose. Adam is described in "Adam: A Method for Stochastic Optimization" by Kingma et al., published in the 3rd Proceedings of the International Conference on Learning Representations, ICLR 2015, San Diego, CA, USA, May 7-9, 2015, the entire contents of which are hereby incorporated by reference for all purposes.

In some instances, natural language-logical form (NL2LF) algorithm(s) are trained by model trainer 640 using the preprocessed data assets 645 (e.g., tokenized data assets). In some instances, the NL2LF algorithm(s) comprise an encoder-decoder neural network. The encoder is comprised of an input layer and one or more encoding layers. The one or more encoding layers are based on top of contextualized word embeddings such as BERT and its family (e.g., ROBERTa, DeBERTa, etc.). The encoder follows an embedding procedure to transform the relevant text (and optionally the database schema) into number/vector representation to conserve the conditions and connection between words and sentences, such that a machine can comprehend the pattern associated with any text, make out the context of the sentences, and optionally learn relationships between words and a given database schema. The result of the encoder will be a state vector or context vector. This state vector will be the input for the decoder. The decoder is comprised of an input layer, one or more decoding layers, a dense layer, and an output layer (e.g., a layer with a softmax function). The one or more decoding layers may include multiple transformer layers. The current recurrent unit accepts a hidden state from the earlier recurrent unit. The result of the decoder will be a logical form such as a OMRL query translated from an utterance within the preprocessed data assets 645.

As should be understood, other training/validation mechanisms are contemplated and may be implemented within the model system 600. For example, the model 625 may be trained and model parameters may be tuned on datasets from a subset of obtained or filtered datasets and the datasets from a subset of obtained or filtered datasets may only be used for testing and evaluating performance of the model 625. Moreover, although the training mechanisms described herein focus on training a new model 625, these training mechanisms can also be utilized to fine tune existing models trained from other datasets. For example, in some instances, a model 625 might have been pre-trained using datasets from one or more different modalities or tasks. In those cases, the models 625 can be used for transfer learning and retrained/validated using the training and validating data as described above.

The training subsystem 605 outputs a trained model 625 with an optimized set of model parameters for use in the NL2LF translation subsystem 610. The NL2LF translation subsystem 610 comprises a predictor for translating input data 655 (e.g., a natural language utterance) to a logical form 660 (e.g., OMRL query). For example, the predictor executes processes for inputting input data 655 into the trained NL2LF model 665, and generating, using the trained NL2LF model 665, a logical form 660 based on features within the input data 655. In some instances, the trained NL2LF model 665 performs one or more semantic parsing tasks to generate the prediction based on the features extracted from the input data 655. The NL2LF translation subsystem 610 outputs a logical form 660 which can be used in the query execution subsystem 620.

The query execution subsystem 620 comprises one or more executors configured for executing the logical form 660 on a system such as database 680 to obtain a result 685 (e.g., an answer to a query within natural language utterances(s)). For example, the one or more executors may be configured to translate or convert the meaning representation language for the logical form 860 to a systems language query or command such as SQL, APIs, REST, GraphQL, PGQL, etc., and execute the systems language query or command on a relational database to obtain an answer to a query posed in the natural language utterance(s).

While not explicitly shown, it will be appreciated that the model system 600 may further include a developer device associated with a developer. Communications from a developer device to components of the model system 600 may indicate what types of input data, utterances, and/or database schema are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

Techniques for Augmenting Training Data

As described herein, a NL2LF model processes a natural language utterance to generate a logical form useable to interact with a system such as query a database. This should result in the correct operation regardless of the various forms the natural language utterance can take. More specifically, the model behavior should be invariant with respect to the different keywords, phrasings, or constructs that may be present in the natural language utterance. Nonetheless, the NL2LF model may still show high error rates when the input utterances include keywords, phrasings, or constructs that are present only in few training examples or totally absent in the model training set. Table 1 below provides a few examples of where a C2OMRL model showed limited robustness.

TABLE 1

| Robustness Issue | Example | Reason behind the robustness issue |
| --- | --- | --- |
| 1 Model does not reliably recognise the keywords "per" and "for each" as trigger for "GROUP BY" | NL = "Show number of invoices grouped by vendor" → SELECT COUNT(vendor.invoice) FROM vendors GROUP BY vendor_id<br>NL = "Show number of invoices per vendor" → SELECT COUNT(vendor.invoice) FROM vendor (missing GROUP BY clause)<br>NL = "Show number of invoices for each vendor" → SELECT COUNT(vendor.invoice) FROM vendor (missing GROUP BY clause) | Only few relevant examples in the model train-set e.g., 10 examples only with "per" + GROUP-BY |
| 2 Model does not reliably handle operators in the NL (e.g., "<=", ">=" "<", ...) | NL = "Show invoices with amount <20" → SELECT * FROM invoices WHERE amount <20<br>NL = "Show invoices with amount >= 20" → SELECT * FROM invoices WHERE amount >20 (wrong predicted operator) | No training examples with operators used as keywords in the NL |
| 3 Model does not reliably recognise the keyword "having" as trigger for "HAVING" | NL = "Show department location having number of employees >5." → SELECT loc FROM dept WHERE employees.empno >5 (missing HAVING clause)<br>NL = "Show department location with number of employees >5." → SELECT loc FROM dept GROUP BY loc HAVING COUNT(employees.empno) >5 | Only few examples (~10) with "having" + HAVING in the model training set |

Overview

Figure 7:
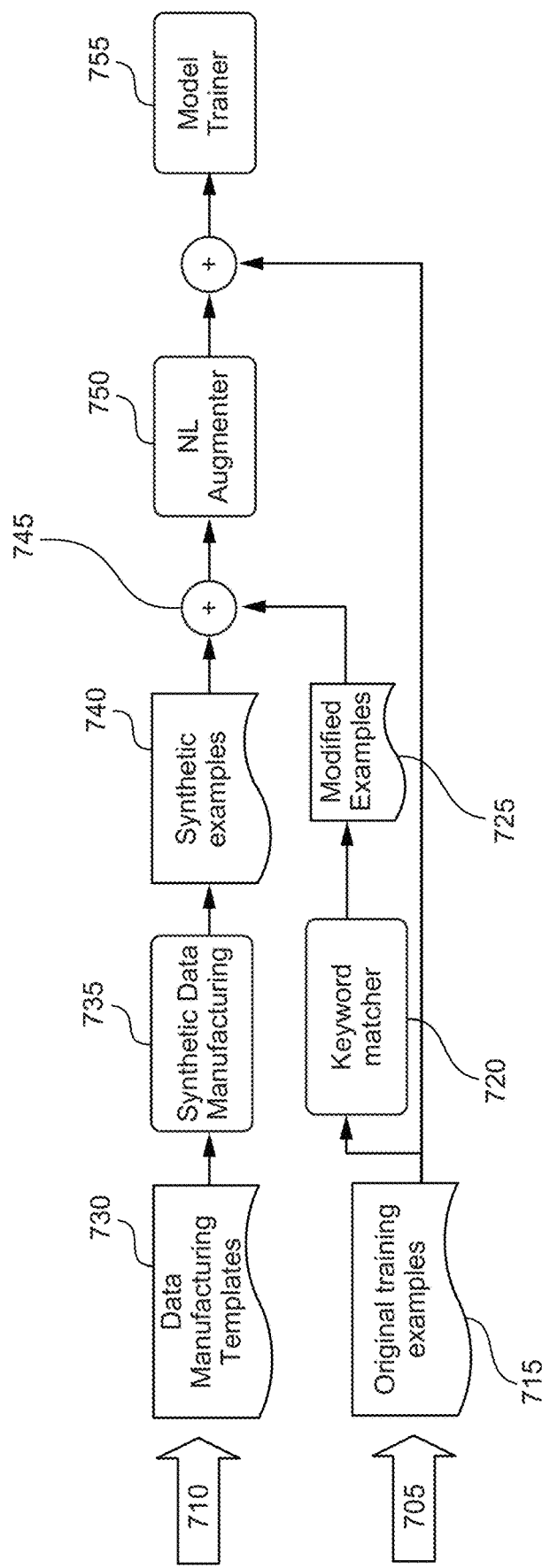
FIG. 7 illustrates a schematic overview of a process for augmenting training data in accordance with various embodiments.

In order to address the robustness challenge and others, a framework is disclosed herein to improve the semantic parser robustness by (semi-) automatically generating additional training examples in a desired robustness "bucket" (i.e., tailored to underrepresentation of different terms) and then re-training the semantic parser based on the augmented training data. As shown in FIG. 7, the additional training examples are generated in a desired robustness "bucket" using the following two techniques: (i) augmentation of existing training examples (path 705), and (ii) synthetic template-based example generation (path 710). At path 705, the original training examples 715 (e.g., C2OMRL training examples) are modified using a keyword matcher 720 to generate a set of modified training examples 725, as described in detail with respect to FIG. 8. At path 710, data manufacturing templates 730 are used by a synthetic data manufacturer 735 to generate a set of synthetic training examples 740, as described in detail with respect to FIG. 9. The set of modified training examples 725 and set of synthetic training examples 740 may be grouped together as a set of augmented training examples at 745. The resulting set of augmented training examples are appended by an augmenter 750 to the original training examples 715 and used by the model trainer 755 (e.g., model trainer 640 described with respect to FIG. 6) to train a new NL2LF model (e.g., a C2OMRL model).

Embodiments of the framework as described herein include one or more of the following aspects:

(1) Automatically Improving Model Robustness
  a. The semantic parser may be weak on certain keywords, operators, or patterns in the NL queries if those keywords, operators, or patterns are underrepresented in the model training set. The framework generates more training data for an input set of "weakness patterns". The model developer tells the framework what patterns to use in the new training data by providing a set of (keyword) replacement and a set of query templates. From that moment on, the framework automatically (i) generates a new data batch for the desired "robustness bucket", (ii) samples examples from the new batch and combines them to the original training data to train a semantic parser or NL2LF model.
(2) Combining Data Augmentations with Synthetic Data Generation (DTMF).
  a. The framework uses the augmentation of existing train examples and synthetic data generation from a data manufacturing tool to increase the training pool of examples and improve training of the semantic parser or NL2LF model.
(3) Using a Custom Grammar(s) to Control the Interpretation Module.
  a. Introduce the concept of custom grammar to:
    i. control the utterance generation to satisfy the "robustness bucket" of interest (See Template Based Data Manufacturing section).
    ii. further diversify the utterances on prefixes, stopwords and other keywords to improve training data variety and model generalization.
(4) Automatically Sampling, Balancing, and Training
  a. The framework implements a "feedback" setup of sampler, trainer, and tuner in order to achieve the best semantic parser or NL2LF model performance.
  b. An automated tuning technique is used to refine the sampling rates for additional new training data. This tuning technique uses intermediate model training trials to figure out the best % of additional new training data to use for training the semantic parser or NL2LF model performance.

Augmentation of Existing Training Examples

Figure 8:
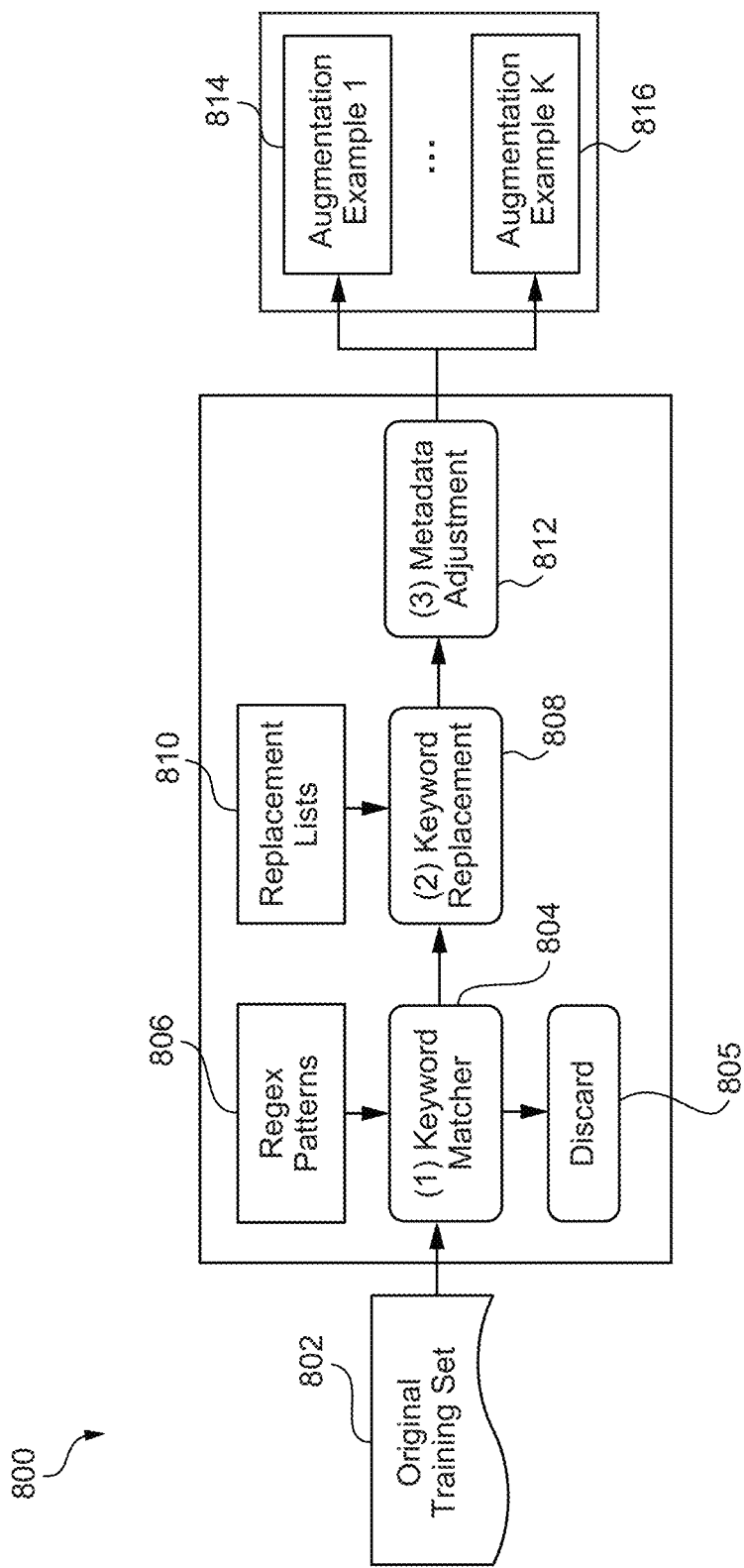
FIG. 8 illustrates a schematic overview of a process for generating training examples using keyword-based data augmentations in accordance with various embodiments.

This data augmentation technique creates new training examples by modifying the existing ones in the training data. The modification occurs in an existing user query utterance which contains the desired keywords associated with the target "robustness bucket". FIG. 8 is a schematic overview 800 of a process for generating training examples using keyword-based data augmentations in accordance with various embodiments. The keyword-based augmentation process takes as input an original training example 802. In some instances, the original training example 802 includes a natural language utterance, corresponding logical form (e.g., in OMRL), and metadata. The logical form is the expected logical form for that utterance and the metadata is a list of other information associated with the utterance and the database schema. Based on the original training example 802, a set of augmentation training examples 814, ..., 816 are generated.

In some instances, a keyword matcher 804 checks if the natural language utterance of the original training example 802 includes any keyword related to a system operation such as a target database query operation. For example, the database query operation is aggregation, and related keywords may include "min," "lowest," "biggest," "average," and "sum." As another example, the database query operation is sorting, and related keywords may include "in order," "ordered," and "sorted."

The keyword matching may, for example, be performed by the key word matcher 804 using a list of manually crafted regular expression (Regex) patterns 806. A Regex, or Regular Expression, is a sequence of characters that forms a search pattern. Regex can be used to check if a string contains the specified search pattern. Mores specifically, prior to augmentation execution, a user (e.g., a developer) defines a list of regex patterns to identify existing training examples in the desired "robustness bucket". An example of regex patterns for a given robustness bucket are provided in Table 2.

TABLE 2

| Robustness Bucket | Regex patterns |
| --- | --- |
| Model does not reliably recognize the keywords "per" and "for each" as a trigger for "GROUP BY" | OMRL (logical form) contains "GROUP BY" NL (utterance) contains ("grouped by") |

At run-time, the key word matcher 804 checks if the NL or the OMRL logical form of the original example matches the regex patterns. If the utterance has a match, it is passed on to a key word replacer 808. If the utterance does not have a match, it is discarded at block 805.

In some instances, the key word replacer 808 automatically replaces the matching keyword in the NL utterance by randomly sampling from a manually crafted replacement list 810 (see, e.g., Table 3, which provides an example replacement list for key words). For example, based on a manually crafted replacement list of synonyms, the matching keyword is replaced with a synonym from the list. For example, the keyword "minimum" is replaced with synonyms such as "lowest," "smallest," and "min." The number of available synonyms may drive the cardinality of the output list of augmentation examples.

TABLE 3

| Robustness Bucket | Regex patterns | Replacement List |
| --- | --- | --- |
| Model does not reliably recognize the keywords "per" and "for each" as a trigger for "GROUP BY" | OMRL (logical form) contains "GROUP BY" NL (utterance) contains ("grouped by") | "grouped by" → ["for each"] "grouped by" → ["per"] |

In some instances, an adjuster 812 automatically updates the metadata based on the changes made to the utterance. The metadata is updated to correspond to the natural language utterance generated by the key word replacer 808. The main function of the adjuster 812 is to update the original offsets from CBSL, which may have shifted since some parts of the NL utterance (e.g., the keywords) have changed. For example, offset metadata that corresponds to a length of the utterance may be adjusted to account for the database values used to fill the natural language utterance using the key word replacer 808. The result is a set of augmentation examples 814, 816, etc., each of which include a natural language utterance, logical form (e.g., OMRL query), and metadata.

Template-Based Synthetic Data Augmentation

Figure 9:
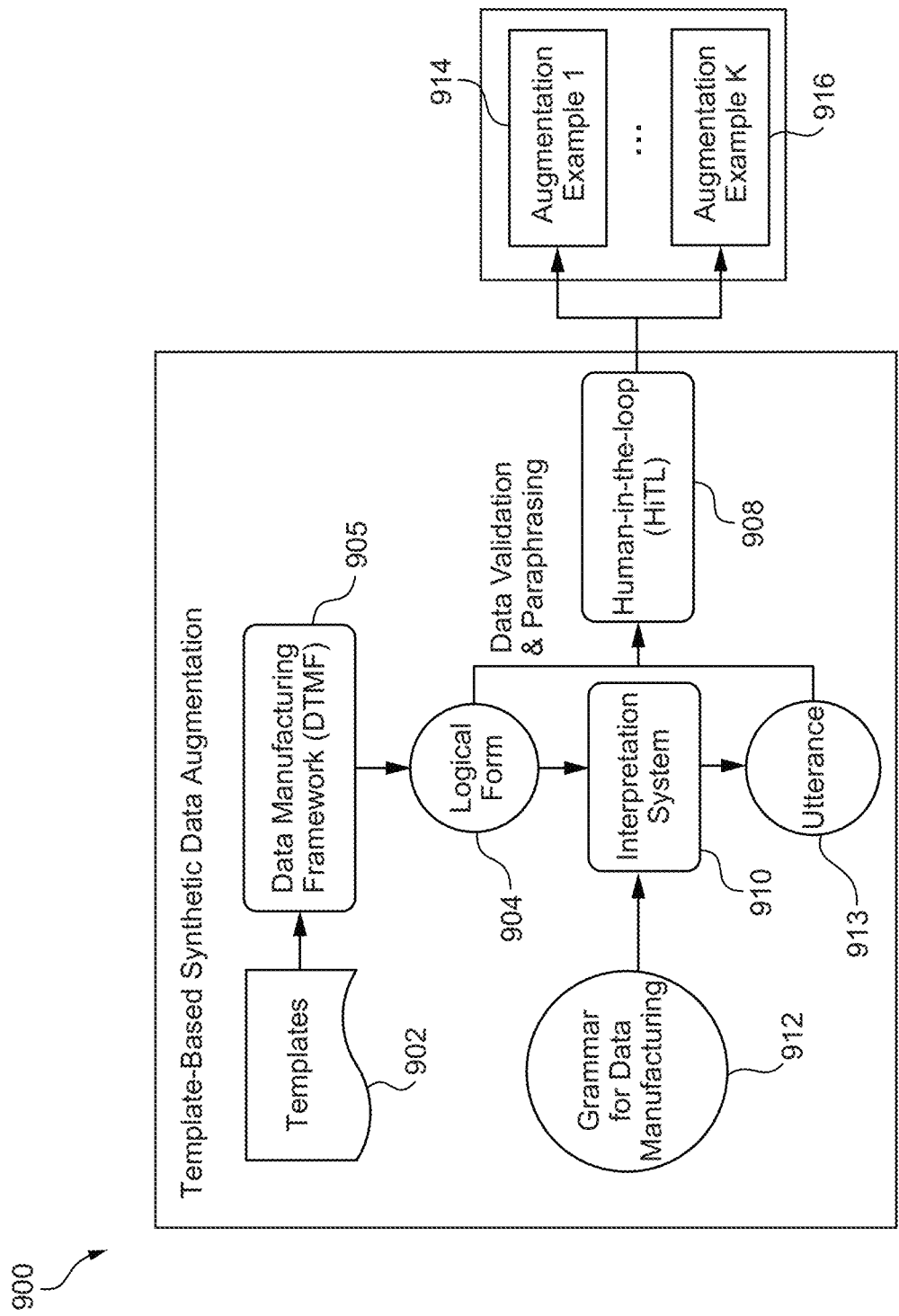
FIG. 9 illustrates a schematic overview of a process for synthesizing training examples using template-based data augmentations in accordance with various embodiments.

This data augmentation technique creates new data by using a Data Manufacturing Framework and an Interpretation System. The new data comprises artificial training examples having two components: (i) a natural language utterance and (ii) a logical form query (e.g., OMRQL). The Data Manufacturing Framework generates the logical form query component, and the Interpretation System generates the user query utterance component. FIG. 9 is a schematic overview 900 of a process for generating training examples using template-based synthetic data augmentation in accordance with various embodiments. The template-based synthetic data augmentation process takes as input logical form query (e.g., OMRQL) templates 902. The templates 902 define the kind of logical form query that is intended to be augmented (e.g., defines a desired robustness "bucket"). Below is an example template defining a kind of OMRQL that has the Where clause with a single entity.

Example Template:

```
{
   "template_id": 1,
   "omrql": "select $AGGR#0($ATTR#0), $ATTR#1 from $ENTITY GROUP BY $ATTR#1",
   "constraint": {
      "nts": {
         "$ATTR#0": {
            "type": [
               "number"
            ]
         },
         "$ATTR#1": {
            "type": [
               "text"
            ]
         },
         "$AGGR#0": {"sample": ["MAX", "MIN", "SUM", "AVG"]}
      }
   },
   "bucket": "Group By keywords"
```

A set of logical form queries 904 can be generated under a data manufacturing framework 905 based on the templates 902 and a synchronous context-free grammar (SCFG). The data manufacturing framework 905 can generate the logical form queries 904 by accessing the original training data that includes natural language utterances and corresponding logical form queries, accessing templates 902 provided by a user (e.g., a developer) or generating the templates 902, learning a SCFG from the original training data, and generating lexicalized logical form queries 904 by lexicalizing the templates 902. In order to lexicalize the templates 902, the templates 902 can be parsed and analyzed based on the SCFG, a relational database can be analyzed and sampled, the parsed templates 902 can be populated with sampled database components to generate lexicalized logical form queries 904, and the lexicalized logical form queries 904 can be validated by a human-in-the-loop process 908 to output a set of synthetic training examples 914, . . . , 916. An example of a generated OMRQL using the above example template is:

```
SELECT AVG(payment_amount), payment_method_code FROM
payments GROUP BY payment_method_code
```

In some instances, the lexicalized logical form queries 904 can be interpreted by the interpretation system 910 using a custom grammar 912 to generate corresponding natural language utterances 913, which can be combined with the lexicalized logical form queries 904 and validated and paraphrased by the human-in-the-loop process 908 to output the set of synthetic training examples 914, . . . , 916. The original training data can be combined with the set of synthetic training examples and/or the set of augmentation examples to form augmented training data.

Follows is a description of an example process for generating training data under a data manufacturing framework based on templates and a SCFG. However, as should be understood other processes may be used for generating training data under a data manufacturing framework as described in U.S. patent application Ser. No. 18/065,406, which is incorporated herein in its entirety for all purposes. The process starts with accessing training data (i.e., original training data). The training data can be obtained from one or more sources such as a database. The training data can include utterances and their corresponding logical form queries. For example, the training data can include the utterance "What is the average life expectancy in the United States of America?" and its corresponding SQL query "SELECT AVG(life_expectancy) FROM T1 WHERE country='United States of America'". In some instances, each utterance can be labeled with a label indicating that it is an utterance, and its corresponding logical form query can be labeled with a label indicating that it is a logical form query and the utterance it corresponds to. For example, the utterance "How many square miles is the United States of America?" can be labeled with the label "first utterance" and its corresponding SQL "SELECT size FROM T1 WHERE country='United States of America'" can be labeled with the label "first SQL query, first utterance".

In some instances, the utterances and their corresponding logical form queries can pertain to a part or parts of a conversation (e.g., a conversation between users and/or between a user and a machine such as the chatbot described above). In some instances, the utterances and their corresponding logical form queries can be non-follow-up utterances and corresponding non-follow-up logical form queries and/or follow-up utterances and corresponding follow-up logical form queries. Non-follow-up utterances and corresponding logical form queries refers to initial utterances and corresponding logical form queries in sequences of utterances and corresponding logical form queries, and follow-up utterances and corresponding logical form queries refers to subsequent utterances and corresponding logical form queries in the sequences of utterances and corresponding logical form queries. In some instances, the utterances and their corresponding logical form queries can pertain to a single relational database or domain and/or multiple relational databases or domains.

The training data can also include database schema information. A database schema defines how data is organized within a database such as a relational database; this includes logical constraints such as table names, fields, data types, and the relationships between these entities. A relational database can be formed of one or more tables with each table of the one or more tables including one or more columns with each column of the one or more columns including one or more values. Each table and column of a relational database can be named with unique identifiers, each of which can include one or more words. In some instances, one or more columns of the relational database may serve as a primary key in which each of the values of the one or more columns that serve as the primary key are unique from each other. In some instances, one or more columns of the relational database may serve as a foreign key which serves to the link the table which includes the one or more columns with another table in the relational database. In some instances, a table or column that does not reference another table or column can be considered a terminal table or column and a table or column that references another table or column can be a non-terminal table or column. In some instances, the database schema information includes one or more data structures for storing the unique identifiers of the one or more tables, the unique identifiers of the one or more columns, and values of each relational database. The unique identifiers and values can be stored in one or more vectors and/or matrices. In some instances, a data structure storing schema information for a relational database can store a directed graph representing the unique identifiers and values.

In some instances, the training data can include utterances and their corresponding logical form queries obtained from one or more public datasets such as the Spider, SParC, and/or CoSQL datasets. Additional information for the Spider dataset is found in "Spider: A Large-Scale Human-Labeled Dataset for Complex and Cross-Domain Semantic Parsing and Text-to-SQL Task" by Yu et al., published in Proceedings of the 2018 Conference on Empirical Methods in Natural Language Processing 2018, which is incorporated herein in its entirety for all purposes. Additional information for the SParC dataset is found in "SParC: Cross-Domain Semantic Parsing in Context" by Yu et al., published in Proceedings of the Association for Computational Linguistics 2019, which is incorporated herein in its entirety for all purposes. Additional information for the CoSQL dataset is found in "CoSQL: A Conversational Text-to-SQL Challenge Towards Cross-Domain Natural Language Interfaces to Databases" by Yu et al., published in Proceedings of the 2019 Conference on Empirical Methods in Natural Language Processing and the 9th International Joint Conference on Natural Language Processing, which is incorporated herein in its entirety for all purposes.

Upon accessing the training data, an SCFG can be learned from the training data and templates can be generated. In some instances, the SCFG can be learned based on the utterances and database schema information included in the training data. An SCFG refers to a grammar based on a finite set of synchronous rules where each synchronous rule has the general form $[A_1 \rightarrow \alpha_1, A_2 \rightarrow \alpha_2]$, where $A_1$, $A_2$ are non-terminals and $\alpha_1$, $\alpha_2$ are synchronous strings (i.e., a bijection exists between the occurrences of non-terminals in $\alpha_1$ and the occurrences of non-terminals in $\alpha_2$, and that this bijection is explicitly provided by the synchronous rule). Additional information for SCFGs can be found in "An Introduction to Synchronous Grammars" by Chiang, published in Part of a tutorial given at ACL, which is incorporated herein in its entirety for all purposes. In some instances, the SCFG can be learned by setting the table names, column names, and values in the database schema information as non-terminal symbols, setting SQL operators (e.g., Max, Min, =, Like, etc.) as non-terminal symbols, setting SQL functions (e.g., Average, Count, First, Last, etc.) as non-terminal symbols, and generating production rules by replacing entities/phrases in the utterances in the training data with the set of non-terminal symbols. Additional information for learning an SCFG for SQL can be found in "Grammar-based Neural Text-to-SQL Generation" by Lin et al., published in arXiv, and "Grappa: Grammar-Augmented Pre-Training For Table Semantic Parsing" by Yu et al., published in ICLR, which is incorporated herein in its entirety for all purposes.

The templates 902 can be generated from the utterances and their corresponding logical form queries in the training data. In some instances, a template 902 includes a delexicalized utterance and its corresponding delexicalized logical form query. In other instances, a template 902 includes a delexicalized logical form query (the corresponding utterance or delexicalized utterance is not present in the template and will be generated by the interpretation system 910, as discussed below in detail). A delexicalized utterance as used herein refers to an utterance in which entities in the utterance that correspond to the names of the tables, columns, and/or values of one or more relational databases are respectively replaced with non-terminal symbols that represent whether the respective entity corresponds to a table, column, or value. For example, the utterance "How many storms occurred in each region?" can be delexicalized into the delexicalized utterance "How many TABLE #2 occurred in each TABLE #1.COLUMN #0?" by replacing the terms "storms" and "regions," which respectively correspond to a table name and column name in an exemplary database schema, with corresponding non-terminal symbols. A delexicalized logical form query as used herein refers to a logical form query in which entities in the logical form query that correspond to the names of the tables, columns, and/or values of one or more relational databases are respectively replaced with non-terminal symbols that represent whether the respective entity corresponds to a table, column, or value. For example, delexicalization of the SQL query "SELECT T1.region_name, count (*) FROM region AS T1 JOIN affected_region AS T2 ON T1.region_id=T2.region_id GROUP BY T1.region_id" yields the delexicalized SQL query "SELECT TABLE #0.COLUMN #0, Count (*) FROM TABLE #0 JOIN TABLE #1 ON TABLE #0.COLUMN #1=TABLE #1.COLUMN #0 GROUP BY TABLE #0.COLUMN #1."

In some instances, templates 902 can be generated automatically from the utterances and/or their corresponding logical form queries in the training data using a trained machine learning model. In some instances, the machine learning model is trained to perform approximate string matching. In some instances, the trained machine learning model can predict which words in a respective utterance correspond to table names, table column names, and column values in the database schema information included in the training data and replace those words with the non-terminal symbols. For example, as depicted in the examples above, predicted table names in the respective utterance can be replaced with the non-terminal symbol TABLE, predicted column names in the respective utterance can be replaced with the non-terminal symbol COLUMN, and predicted values in the respective utterance can be replaced with the non-terminal symbol VALUE. In some instances, the non-terminal symbols TABLE, COLUMN, and VALUE can include an index representing a table number or a column number and a hashtag symbol that separates the non-terminal symbol from its index (e.g., TABLE #0.COLUMN #0, TABLE #0). In some instances, the trained machine learning model can include one or more neural networks trained to perform approximate string matching with training data that includes utterances labeled with database schema information. In some instances, templates generated using a trained machine learning model may not generalize well across databases and may produce inconsistent delexicalized parts in both the utterance and the corresponding logical form query.

Alternatively, or additionally, in some instances, the templates 902 which can generalize well across databases and include consistent delexicalized parts in both the utterance and/or the corresponding logical form query can be generated by a user (e.g., a developer) based on a rules scheme. In some instances, in order to generate a template, the user can apply the following rule scheme: 1. non-terminals in the utterance and its corresponding logical form query in the template should be equal (i.e., there should not be a hanging non-terminal in either side); 2. there should not be any lexicalized entities in the template utterance that can cannot generalize well across databases; 3. non-terminals are defined as elements of either table, column, or value of a database schema with an enumeration starting from 0 (i.e., table, column, and value which do not reference another table, column, or value), all column and values should be delexicalized, and a table should be delexicalized only if it is mentioned in the utterance but a column of that table does not appear anywhere in the utterance; 4. all parts of the utterance should be kept if feasible (e.g., do not remove a part of an utterances that corresponds to a logical form operator, but remove verbs of the utterance that hinder generalization of the template); 5. for any identified non-terminal symbol, replace the identified non-terminal symbol with the respective non-terminal symbol in all capital letters followed by a hashtag symbol that separates the non-terminal from its index (e.g., TABLE #0.COLUMN #0, TABLE #0); and 6. check the consistencies of the template and retain any templates that are consistent and discard any templates that are inconsistent.

Upon generating the templates 902 and the SCFG, the templates 902 can be lexicalized to generate the lexicalized logical form queries 904. In some instances, the templates 902 can be lexicalized using the SCFG. A lexicalized utterance as used herein refers to a delexicalized utterance in which non-terminal symbols of the utterance are replaced with sampled components of a database. For example, the delexicalized utterance "Show all TABLE #0.COLUMN #0 with at least 3 TABLE #0" can be lexicalized into the lexicalized utterance "Show all player attributes shot power with at least 3 player attributes" because "player attributes" is a table in the database and "shot power" is a column in that table. Similarly, a lexicalized SQL query as used herein refers to a delexicalized SQL query in which the non-terminal symbols are replaced with sampled components of a database. For example, the delexicalized SQL query "SELECT TABLE #0.COLUMN #0 FROM TABLE #0 GROUP BY TABLE #0.COLUMN #0 HAVING Count (*)>=3" can be lexicalized into the lexicalized SQL query "SELECT Player_Attributes.shot_power FROM Player_Attributes GROUP BY Player_Attributes.shot_power HAVING Count (*)>=3.0."

In some instances, in order to generate the lexicalized training data, the templates 902 are parsed to produced parsed templates. In some instances, each parsed template includes a parsed delexicalized utterance and its corresponding parsed delexicalized logical form query. In other instances, each parsed template includes a parsed delexicalized logical form query. The templates 902 can be parsed using a parsing algorithm and the SCFG. In some instances, the parsing algorithm can apply the SCFG to each delexicalized utterance and/or its corresponding delexicalized logical form query to generate an abstract syntax tree (AST) for each parsed delexicalized utterance and/or its corresponding parsed delexicalized logical form query in which their respective logical syntactic components are identified and represented in the AST. An AST as used herein refers to a tree representation of the abstract syntactic structure of the delexicalized utterances and/or their corresponding delexicalized logical form queries. In some instances, the ASTs can be structured in the Zephyr Abstract Syntax Description Language format. Additional information for the Zephyr Abstract Syntax Description Language format can be found in "The Zephyr Abstract Syntax Description Language" by Wang et al., published In Proceedings of the Conference on Domain-Specific Languages on Conference on Domain-Specific Languages (DSL), which is incorporated herein in its entirety for all purposes. For example, for a delexicalized SQL query: "SELECT TABLE #0.COLUMN #0 FROM TABLE #0 WHERE TABLE #0.COLUMN #1='VALUE #0'", the following AST can be generated:

```
{
    "_type": "sql",
    "select": {
        "_type": "select",
        "is_distinct": false,
        "aggs": [
            {
                "_type": "agg",
                "agg_id": {
                    "_type": "NoneAggOp"
                },
                "val_unit": {
                    "_type": "Column",
                    "col_unit1": {
                        "_type": "col_unit",
                        "agg_id": {
                            "_type": "NoneAggOp"
                        },
                        "is_distinct": false,
                        "col_id": "___table#0.column#0___"
                    }
                }
            }
        ]
    },
    "where": {
        "_type": "Eq",
        "val_unit": {
            "_type": "Column",
            "col_unit1": {
                "_type": "col_unit",
                "agg_id": {
                    "_type": "NoneAggOp"
                },
                "is_distinct": false,
                "col_id": "___table#0.column#1___"
            }
        },
```

-continued

```
        "val1": {
            "_type": "String",
            "s": "\"value#0\""
        }
    }
}
```

In some instances, in order to generate the lexicalized training data, the templates 902 are analyzed to identify one or more constraints in each template, a database is analyzed to identify its components, database components are sampled based on the identified one or more constraints in each template, and the non-terminal symbols in each delexicalized utterance and/or its corresponding delexicalized logical form query are replaced with the sampled components. In some instances, each delexicalized utterance and/or its corresponding delexicalized logical form query of the templates 902 are analyzed to identify each non-terminal symbol in the delexicalized utterance and/or the delexicalized logical form query. In some instances, each COLUMN non-terminal symbol is mapped to one a plurality of COLUMN types and a constraint of a plurality of constraints is defined for each COLUMN non-terminal symbol based on its respective COLUMN type. In some instances, each VALUE non-terminal symbol is mapped to a corresponding COLUMN non-terminal symbol. In some instances, the plurality of COLUMN types include a TEXT type column in which the values of the column are text, a NUMBER type column in which the values of the column are numbers, a BOOLEAN type column in which the values of the column are Boolean operators, a TIME type column in which the values of the column are timestamps, a CURRENCY type column in which the values of the column are currency values, an AGE type column in which the values of the column are ages. In some instances, the plurality of constraints includes an Aggregateable, a Requestable, a Sortable, a Comparable, an Orderable, a Groupable, and a Filterable constraint. The foregoing column types and constraints are not intended to be limiting and other column types and constraints are possible (see below). In some instances, each COLUMN non-terminal symbol is mapped to one of a plurality of COLUMN types matching the characters of the non-terminal symbol to the characters of the plurality of COLUMN types (e.g., via string-matching) and determining whether a VALUE non-terminal symbol matches the COLUMN type. For example, a COLUMN #0.NUMBER non-terminal symbol can be string-matched to a NUMBER type and the type can be validated by determining whether a VALUE non-terminal symbol corresponds to a number, which is associated with the COLUMN #0 non-terminal symbol, corresponds to a number. The following Table 4 shows an example of a mapping that includes a string-matching name check and a validation check.

TABLE 4

| Data Type | Type | Name Check | Validation Check |
| --- | --- | --- | --- |
| Meta Type | TEXT | — | — |
| | NUMBER | — | is_numeric( ) |
| | BOOLEAN | — | true/false/yes/no/t/f/y/n |
| | TIME | yes | — |
| | OTHERS | — | — |

TABLE 4-continued

| Data Type | Type | Name Check | Validation Check |
|---|---|---|---|
| Custom Type | CURRENCY | yes | — |
| | AGE | yes | is_numeric( ) value_within(1, 150) |
| | ENUM | no | num_rows >= 20 distinct value <= 5 |
| | DATE | yes | — |
| | MEASURE_BYTES | yes | is_numeric( ) |
| | MEASURE_WEIGHT | yes | is_numeric( ) |
| | MEASURE_LENGTH | yes | is_numeric( ) |
| | MEASURE_SURFACE | yes | is_numeric( ) |
| | MEASURE_VOLUME | yes | is_numeric( ) |
| | MEASURE_DURATION | yes | is_numeric( ) |
| | PHONE_NUMBER | — | all samples match phone number (e.g., using regular expressions) |
| | LOCATION | yes | — |
| | EMAIL_ADDRESS | yes | all samples match email (e.g., using regular expressions) |
| | URL_ADDRESS | — | all samples match url (e.g., regular expressions) |
| | IP_ADDRESS | — | all samples match IP address (e.g., using regular expressions) |
| | ID | yes | — |

In some instances, components are sampled from the database based on a database analysis of the database and the analyzed templates. In some instances, the database is one or more relational databases with each database having components (e.g., tables, columns, and values). In some instances, a database analysis is performed on the one or more databases to identify its components. In some instances, the one or more databases and its components can be obtained from one or more sources such a user or the WikiSQL dataset. Additional information is found in "Seq2sql: Generating structured queries from natural language using reinforcement learning" by Zhong et al., published in CoRR, which is incorporated herein in its entirety for all purposes.

In some instances, components are sampled from the database based on the analysis of the non-terminal symbols in the analyzed templates at the template analysis stage. In some instances, prior to sampling components, each database in the one or more databases can be analyzed at database analysis stage to identify the components (e.g., tables and their names, columns and their names, and the values in column) of the respective database. In some instances, database analysis stage is performed for a database based on schema information for the database. In some instances, in order to sample components for a respective analyzed template of the templates, a database of the one or more databases can be randomly selected and its components can be sampled and used to lexicalize the respective analyzed template. In some instances, for each respective analyzed template of the templates, a table name is sampled from the selected database for each TABLE non-terminal symbol in the respective analyzed template, a column name is sampled from the sampled table for each COLUMN non-terminal symbol in the respective analyzed template, and a value is sampled from the sampled column for each VALUE non-terminal symbol in the respective analyzed template. In some instances, for TABLE and COLUMN non-terminal symbols having an index, the table and column names can be sampled based on the index value. For example, for a database having two tables and five columns in each table and a TABLE #1.COLUMN #2 non-terminal symbol, the first table and second column in that table can be sampled from the database.

In some instances, the table name can be randomly sampled from the database. For example, a table name can be randomly selected from the database. In some instances, the table name can be sampled from the database based on the index of a non-terminal symbol (e.g., a table with an index of 1 in the database can be sampled for a TABLE #1 non-terminal symbol.) In some instances, the column name is sampled based on the table to which it belongs, the type of column it is, and its constraints. For example, a column name in the database belonging to a particular table and having numbers as values and requestable as a constraint will be sampled for COLUMN non-terminal symbols having a type NUMBERS and a Requestable constraint. In some instances, when sampling a column name for the utterance, any spaces in the column can be replaced with "_" and any periods (e.g., ".") can be removed, but, when sampling a column name for the logical form query, the column name is not changed. In some instances, the table names and the column names sampled for non-terminal symbols in the utterance should be the same for the same non-terminal symbols in the logical form query. In other words, there should be a one-to-one mapping between the sampled components for non-terminal symbols in the utterance and the sampled components for the same non-terminal symbols in the logical form query. In some instances, values are sampled by determining whether the VALUE non-terminal symbol is associated with an operator (e.g., <, <=, >, >=, LIKE, etc.) and sampling values from the corresponding column is performed based on the associated operator. For less than and greater than type operators, values are randomly sampled between the minimum values and maximum of the corresponding column. For the LIKE and other operator, values are randomly sampled and the characters at the start, end, and/or a combination of both the start and end of the sampled values are replaced with a "%" character. In some instances, determining whether to replace the starting characters, the ending characters, and/or the both the starting and ending characters with a "%" character can be determined randomly and the number of characters to replace can be random.

In some instances, each parsed template of the parsed templates can be lexicalized with the sampled components for the respective parsed template to produce lexicalized training examples (e.g., the lexicalized logical form queries 904). In some instances, a parsed utterance and/or its corresponding parsed logical form query in parsed templates 902 can be lexicalized by replacing the non-terminal symbols of the utterance and its corresponding logical form query with the components of the selected database sampled for the respective parsed utterance and logical form query.

In various instances, the logical form queries 904 are interpreted using the interpretation system 910 and custom grammar 912 configured to generate highly readable, natural language utterances 913 as the interpretation of the logical form queries 904 output from the data manufacturing framework 905. The interpretation system 910 includes an analyzer, grammar data structure, a LF-to-NL translator, and a NL composer. The analyzer analyses the lexicalized logical form queries 904 (logical form in an intermediate database query language such as MRL or OMRL) and converts them into logical form structures (e.g., MRL or OMRL structures). The grammar data structure specifies the rules (i.e., the custom grammar 912) to translate the logical form structures into natural language expressions. The LF-to-NL translator converts the logical form structures into natural language expressions using the grammar data structure. The NL composer combines individual natural language expressions derived from the logical form structures to form the output interpretation utterance 913.

The analyzer performs analysis and conversion of the logical form queries 904 using various natural language processing techniques. Initially, the analyzer parses the logical form queries 904 to convert them into logical form structures. In parsing, the logical form queries 904 are broken into smaller pieces and analyzed so downstream subsystems or services (e.g., the LF-to-NL translator) can understand the logical form queries 904. The parser does this by building a data structure out of the pieces of the logical form queries 904. For example, for a logical form query: SELECT location FROM ClEvents GROUP BY location ORDER BY COUNT(*) DESC LIMIT 3, the parsing may generate the logical form structure: SELECT (location); FROM (ClEvents); GROUP BY (location); ORDER BY COUNT(*); DESC LIMIT (3). Consequently, each operation and associated attribute(s) (i.e., values or terms acted on by the operation) are extracted into individual statements to generate the logical form structure. Because of challenges related to deciphering and translating various logical form statements, the analyzer also identifies certain patterns within the logical form queries 904 (or the parsed logical form structure) and attaches tags that indicate specific logical form patterns requiring special translation procedures. Specific key words and/or clauses can be predefined and used to identify the logical form patterns that require tagging. The tagging attaches a non-hierarchical keyword or term (i.e., key words and/or clauses) assigned to a piece of information (i.e., the logical form patterns) which helps describe specific logical form patterns requiring special translation procedures and allows it to be found or processed automatically in downstream processing. In some instances, the analyzer identifies logical form queries 904 containing the following key words and/or clauses: "SELECT*", "SELECT COUNT(*)", "SELECT DISTINCT", "SELECT DISTINCT*", "SELECT COUNT(DISTINCT*)", "ORDER BY" and "LIMIT", "LIMIT" (but not the clause "ORDER BY"), "ORDER BY" (but not the clause "LIMIT"), and/or "HAVING" and tags those key words and/or clauses as requiring special translation procedures. However, it should be understood that any combination of key words and/or clauses (including different/other key words and/or clauses) can be used depending on the logical form being analyzed and logical form patterns determined to require special translation procedures.

The grammar data structure provides detailed rules (i.e., the custom grammar 912) for how to translate each logical form statement within the logical form structure into a corresponding natural language expression. The custom grammar 912 can be used instead of pre-defined templates (as optionally described with respect to the data manufacturing framework 905) to translate a logical form statement into a corresponding natural language expression because templates may be inefficient if the number of templates to match is large, the templates may support limited syntax, the templates may use cumbersome statements/expressions that may lead to less readable outputs, and the templates may output natural language expressions for a logical form statement that consists of multiple sentences which are less readable. The custom grammar 912 is a specialized context free grammar containing a set of grammar rules to efficiently translate each logical form structure into a corresponding natural language expression that contain the target keywords (e.g., "per" and "for each") identified based on the desired robustness "bucket" (i.e., tailored to underrepresentation of different terms). A snippet of a custom grammar 912 that can generate the target utterances for described above example of the generated OMRQL:

```
1.     {
2.
3.         "WITH" --> ["with"],
4.         "IS" --> ["is"],
5.         "THE" --> ["the", ""],
6.         "ALL" --> ["all"],
7.         "AVG" --> ["average", "mean", "avg"],
8.         ...
9.         "OF" --> ["of"],
10.        "GROUP BY" --> ["per", "for each"],
11.        "REV_ORDERED" --> ["reversely ordered"],
12.        "ORDERED" --> ["ordered"],
13.        ...
14.
15.        "SELECT" --> ["Show ${nl_select}", "Return
       ${nl_select}", "Present ${nl_select}", "Given me
       ${nl_select}", "List ${nl_select}", "Display
       ${nl_select}"],
16.
17.        ...
18.     }
```

As shown in this snippet of a custom grammar 912, the rule "GROUPBY"→["per", "for each"] is defined to translate the OMRQL keyword GROUP BY into the words "per" of "for each" in the output interpretation utterances. The objective of the custom grammar 912 is two-fold. First, it allows to control the natural language utterance generation so that the utterances will contain the target operators and keywords of interest. In the example above, the custom grammar maps "GROUP BY" to keywords "per" and "for each", which are the ones for which more training data is desired. Second, the custom grammar introduces additional rules to increase the diversity of the generated utterances on prefixes, stop-words and other keywords. Specifically, for the custom grammar example above:

(1) The rule "THE"→["the", " "] defines the option of dropping or not-dropping the word "the" in the output.

(2) The rule "SELECT"→ ["Show ${nl_select}", "Return ${nl_select}", "Present ${nl_select}", "Given me ${nl_select}", "List ${nl_select;", "Display ${nl_select}"]defines the possible prefixes in the output utterances.

It was found by experimentation that the custom grammar can further boost the performance of the semantic parser on "robustness buckets" by an additional ~5%.

In some instances, the grammar data structure provides the detailed rules in the Backus-Naur Form as a list of context-free grammar rules. The rules include non-terminal and terminal terms or clauses. The non-terminals terms or clauses are syntactic variables that denote the sets of strings, which further help define the language, generated by the grammar. The non-terminal terms or clauses include syntax that have different expressions for different logic clauses, including corresponding natural language terms or expressions to be used. The terminal terms or clauses are the components of the statements generated using a grammar and specify corresponding natural language terms or expressions to be used. Examples of non-terminal and terminal terms or clauses are provided below in Table 5. The values (e.g., syntax, terms, expressions, etc.) and associated non-terminal and terminal terms or clauses are stored within the grammar data structure, for example, as a table or matrix with rows and columns.

TABLE 5

| # Nonterminals | |
|---|---|
| Interpretation utterance :: | SelectExpr LimitExpr FromExpr GroupByExpr HavingExpr OrderByExpr WhereExpr"." |
| SelectExpr :: | "Show" (Value "and")* Value |
| Value :: | Identifier \| Function \| Literal \| Asterisk |
| Identifier :: | "the" AttributeDisplayName [AttributeDisplayName]* |
| Function :: | FunctionExpr Value |
| FunctionExpr :: | CountExpr \| DistinctExpr \| SumExpr \| AvgExpr \| MinExpr \| MaxExpr |
| FromExpr :: | "of the" CompositeEntityDisplayName |
| GroupByExpr :: | "per" ValueList |
| ValueList :: | (Value "and")* Value |
| HavingExpr :: | "having" Conditional |
| Conditional :: | Comparison \| Logical |
| Logical :: | ConditionalLogicalNameConditional [LogicalNameConditional]* |
| Comparison :: | ValueComparisonName Value \| Value "is between" Value "and" Value |
| ComparisonName :: | EqualExpr \| NotEqualExpr GreaterExpr \| GreaterEqualExpr LesserExpr \| LesserEqualExpr \| LikeExpr \| InExpr \| NotInExpr |
| LikeExpr :: | ContainsExpr \| Starts WithExpr \| EndsWithExpr |
| OrderByExpr :: | "ordered by" OrderByValueList "ordered reversely by" OrderByValueList |
| OrderByValueList :: | (OrderByValue "and")* OrderByValue |
| OrderByValue :: | Identifier |
| WhereExpr :: | "where" Conditional |
| # Terminals | |
| LimitExpr :: | "the first" number "of" |
| LogicalName :: | "and" \| "or" \| "not" |
| Asterisk :: | "all" |
| CountExpr :: | "the number of" |
| DistinctExpr :: | "the unique" |
| SumExpr :: | "the total" |
| AvgExpr :: | "the average" |
| MinExpr :: | "the minimum" |
| MaxExpr :: | "the maximum" |

TABLE 5-continued

| EqualExpr :: | "is" |
|---|---|
| NotEqualExpr :: | "is not" |
| GreaterExpr :: | "is greater than" |
| GreaterEqualExpr :: | "is at least" |
| LesserExpr :: | "is lesser than" |
| LesserEqualExpr :: | "is at most" |
| ContainsExpr :: | "contains" |
| StartsWithExpr :: | "starts with" |
| EndsWithExpr :: | "ends with" |
| Literal :: | string |
| CompositeEntityDisplayName :: | string |
| AttributeDisplayName :: | string |

The above-noted grammar in Table 5 is provided for explanation purposes only and any combination of grammar rules and target keywords can be applied without departing from the scope of the present disclosure. In some instances, the grammar rules provide a hierarchical structure for the grammar data structure. For example, the following pseudo-code represents a hierarchical structure in that "Value" is referred to in the "SelectExpr" definition and then "Value" is further defined in a distinct definition:

SelectExpr="Show" (Value "and")*Value

Value=Identifier|Function|Literal|Asterisk.

The LF-to-NL translator applies the custom grammar from the grammar data structure to translate each logical form statement within the logical form structure into a corresponding natural language expression. The grammar can be applied using various techniques. For example, the LF-to-NL translator can obtain the grammar using a tree lookup interpreted from the logical form that includes nodes and connectors that refer to variables in each of the logical form statements, such that components of the tree are used to look up the natural language expression corresponding to each of the logical form statements based on the grammar. For example, the OMRL structure of "SELECT SUM(invoice_amount) FROM ap_invoices_all_testdata WHERE approval_status='pending'" includes three nodes of SELECT, FROM, and WHERE. Additionally, each non-terminal/node can have their own sub nodes, entities, operators, etc. Continuing the example, the SELECT node is associated with SUM(invoice amount), the FROM node is associated with ap_invoices_all_testdata, and WHERE is associated with approva_status='pending'. The LF-to-NL translator can apply the grammar rules to each of the nodes to create a corresponding natural language expression. By applying the grammar rules from Table 5 to the above example, three different natural language expressions (or three portions of the same LF query) are created as follows: i) "SELECT SUM(invoice_amount)" translating to "Show the total invoice amount" ii) "FROM ap_invoices_all_testdata" translating to "of the invoices" and iii) "WHERE approval_status='pending'" translating to "where the approval status is pending".

The NL composer combines the natural language expressions output from the LF-to-NL translator to form the output interpretation utterance 913 (a single natural language expression). The NL composer combines the separate natural language expressions in a manner that is highly readable for the user. The NL composer supports two different strategies for combining the utterances into a readable format. The first (or "simple") strategy includes a simple composition technique that concatenates the natural language expressions together in a chain or series to form the output interpretation utterance 913. The second (or "specialized") strategy includes a specialized composition technique that applies specialized procedures to the natural language expressions derived from logical form statements having particular patterns. In the second strategy, the NL composer performs additional steps beyond concatenating the natural language expressions together.

In some instances, the tags applied by (or not applied by) the analyzer dictate which strategy the NL composer implements for a given set of natural language expressions. If no tags were applied by the analyzer to the logical form statements, the simple strategy is selected, otherwise, the specialized strategy will be used to determine which specialized procedure(s) to follow based on the pattern(s) corresponding to the tags. The simple strategy concatenates all available natural language expressions in a chain or series to form the output interpretation utterance 913. The order of the natural language expressions in the chain or series may be specified by a user or predefined within the simple strategy (e.g., specified within an operation clause used for the concatenating such as group by or concatenation clause). For example, continuing the example discussed with respect to the LF-to-NL translator, the NL composer would concatenate: i) "Show the total invoice amount" ii) "of the invoices", and iii) "where the approval status is pending" to obtain the output interpretation utterance 913: "Show the total invoice amount of the invoices where the approval status is pending".

In embodiments where a tag is applied by the analyzer, the specialized strategy is used to determine which specialized procedure(s) to follow for handling the logical form patterns corresponding to the applied tags. The specialized procedure(s) can include, but are not limited to, keyword asterisk "*", ORDER-BY (without LIMIT) clause, ORDER-BY (with LIMIT) clause, GROUP-BY clause, and LIMIT (without ORDER-BY). The resulting clauses modified using the special procedures will then be concatenated with the remainder of clauses (unmodified) via the simple procedure.

In some instances, the keyword asterisk "*" strategy translates any presence of an asterisk "*" in a logical form query to the display name of the entity (e.g., table) mentioned in the FROM clause. The keyword asterisk operates in this manner because typically the usage of "*" by the user is to express the intent of selecting all the rows from the entity mentioned in the FROM clause. For example, an original user query of, "ordered list of apps with more than 10 virtual servers" will translate into a OMRL query of "SELECT*FROM RApplicationData WHERE total_virtual_servers>10 ORDER BY*ASC". Because the query includes "*", the asterisk specialized strategy is implemented and the utterance 760 interpretation (derived from the OMRL query) is "Show the ordered applications where the total virtual servers is greater than 10.".

In some instances, the ORDER-BY (without LIMIT) clause strategy evaluates whether there is only one attribute mentioned with SELECT or whether there is more than one attribute mentioned with SELECT. The evaluation of how many attributes is mentioned with SELECT will dictate how the natural language expressions are combined to make the output more readable. If there is only one attribute mentioned with SELECT, the translation of the ORDER-BY (without LIMIT) clause is omitted and the SELECT clause is translated into "Show the ordered <attribute_display_name>". In other words, the SELECT attribute will suppress the same ORDER-BY attribute because there are two iterations of the terms. For example, an original user query of, "Sorted cost values for project 13723600" will translate into a OMRL query of "SELECT value FROM Cost WHERE CSR.project_num=13723600 ORDER BY value ASC". Because the query includes a single attribute (value) with "SELECT", the ORDER-BY (without LIMIT) clause strategy is implemented and the utterance interpretation (derived from the OMRL query) is "Show the ordered value of the cost where the project number is 13723600.".

If there is more than one attribute mentioned in SELECT the translation of the ORDER-BY clause is implemented as would normally occur "ordered by <ORDER-BY-attribute-display-name>" for the keyword "ASC" or "ordered reversely by <ORDER-BY-attribute-display-name>" for the keyword "DESC". For example, an original user query of, "invoices for Marcopolo ordered by due date" will translate into a OMRL query of "SELECT*FROM accounts_payable_invoices WHERE party.party_name='marcopolo' ORDER BY invoice_accounts_payables_invoice_installments_back_link.due_date ASC". Because the query includes a more than one attribute ("*" and FROM accounts_payable_invoices) with "SELECT", the ORDER-BY (without LIMIT) clause strategy is implemented and the utterance 760 interpretation (derived from the OMRL query) is "Show all the invoices ordered by the installment due date where the party name is "marcopolo.".

In some instances, the ORDER-BY (with LIMIT) clause strategy evaluates whether the ORDER-BY and LIMIT are both present. If ORDER-BY and LIMIT are both present, the ORDER-BY-LIMIT clause translates the OMRL query using a specialized template as "with the top/bottom <LIMIT-number><ORDER-BY-attribute>". For example, an original user query of, "Bottom 15 invoices, based on invoice amount" will translate into a OMRL query of "SELECT*FROM accounts_payable_invoices ORDER BY invoice_amount ASC LIMIT 15". Because the query includes ORDER-BY and LIMIT, the ORDER-BY-LIMIT clause strategy is implemented and the utterance interpretation (derived from the OMRL query) is "Show all the invoices with the bottom 15 invoice amount.".

In some instances, the GROUP-BY clause strategy evaluates whether there is only one attribute mentioned with SELECT or whether there is more than one attribute mentioned with SELECT. The evaluation of how many attributes are mentioned with SELECT will dictate how the natural language expressions are combined to make the output more readable. If there is only one attribute mentioned with SELECT (which will also be mentioned in GROUP-BY), the translation of the GROUP-BY clause is omitted. In other words, the SELECT attributes will suppress the same GROUP-BY attributes because there are two iterations of the terms. For example, an original user query of, "show all jobs, sorted by the total salary of employees in each job" will translate into a OMRL query of "SELECT job FROM emp GROUP BY job ORDER BY SUM(sal) ASC". Because the query includes a single attribute (job) with "SELECT", the GROUP-BY clause strategy is implemented and the utterance interpretation (derived from the OMRL query) is "Show the job of the employees ordered by the total salary.".

If there is more than one attribute mentioned in SELECT, the translation of those SELECT attributes that are also mentioned in GROUP-BY are omitted but their mentions in GROUP-BY are retained). For example, an original user query of, "average salary per job title" will translate into a OMRL query of "SELECT AVG(sal), job FROM emp GROUP BY job". Because the query includes a more than one attribute (AVG(sal) and job) with "SELECT", the GROUP-BY clause strategy is implemented and the utterance interpretation (derived from the OMRL query) is "Show the average salary per job.".

In some instances, the LIMIT (without ORDER-BY) clause strategy evaluates whether an ORDER-BY clause is also present. If the ORDER-BY clause is present, then the above ORDER-BY-LIMIT strategy for translation is implemented. For example, an original user query of, "Bottom 15 invoices, based on invoice amount" will translate into a OMRL query of "SELECT*FROM accounts_payable_invoices ORDER BY invoice_amount ASC LIMIT 15". Because the query includes ORDER-BY and LIMIT, the ORDER-BY-LIMIT clause strategy is implemented and the utterance interpretation (derived from the OMRL query) is "Show all the invoices with the bottom 15 invoice amount.". If no ORDER-BY clause is present, LIMIT clause strategy will be performed using a template of "the first <LIMIT-number> of". For example, an original user query of, "Top 5 invoices" will translate into a OMRL query of "SELECT*FROM accounts_payable_invoices LIMIT 5". Because the query includes a LIMIT clause and no ORDER-BY clause, the LIMIT clause strategy is implemented and the utterance interpretation (derived from the OMRL query) is "Show the first 5 of the invoices.".

Using one or more of the above specialized procedures (based on pattern recognition), in combination with the translation rules, a specialized strategy can be applied to produce a more readable output. An example of an OMRL query output that requires specialized strategy is "SELECT location FROM CIEvents GROUP BY location ORDER BY COUNT(*) DESC LIMIT 3". The OMRL query output includes the tags of SELECT and ORDER BY, so the NL expression is identified as an expression that needs specialized treatment to make the output interpretation utterance 913 more readable. First, as discussed above, the OMRL query output can be translated into five natural language expressions using the grammar rules. This example would perform the following translations of i) "SELECT location" translating to "Show the locations", ii) "FROM CIEvents" translating to "of the events", iii) "GROUP BY location" translating to "per location", iv) "ORDER BY COUNT(*)" translating to "ordered reversely by the number of events", and v) "LIMIT 3" translating to "the first 3 of". If the simple strategy is applied, then the resulting utterance would be unclear because it would read, "Show the first 3 of the locations of the events per location ordered reversely by the number of events.". Whereas the specialized strategy can be applied to this example to produce a more readable output of "Show the location of the events with the top 3 number of events.", using the above specialized procedures (based on pattern recognition).

Examples of the natural language utterances generate from the interpretation system 910 corresponding to the above generated OMRQL-SELECT AVG(payment_amount), payment_method_code FROM payments GROUP BY payment_method_code-include:

(1) Show average payment amount per payment method code.
(2) Show the mean payment amount for each payment method code.
(3) Return avg payment amount per payment method code.

In some instances, the logical form queries 904 and corresponding output interpretation utterances 913 can be in put into a human-in-the-loop process 908, which performs one or more quality control tasks and output the set of synthetic training examples 914, . . . , 916. The one or more tasks can include:

(1) Validation: remove non-sensational examples, e.g., "Show me all happy hour members where member age is at most 67 and member time of purchase is fewer than 82"

(2) Paraphrasing: adjust/harmonize the utterance if necessary.
(3) Value replacement: replace non-sensational values in conditions, e.g., replace "year" values to be in the (1900-2022) range.
(4) Diversify keywords: diversify some keywords in a query utterance. e.g., if all utterances with MIN in the OMRQL include the keyword "minimum", it is better to diversify the keyword using alternative keywords, such as "min", "smallest", and "lowest".

For example, each training example of the logical form queries 904 and corresponding output interpretation utterances 913 can be validated and training examples that are valid can be included in the set of synthetic training examples 914, . . . , 916 and training examples that are not valid can be discarded. In some instances, in order to validate each training example, a constraint check can be performed on each training example. The constraint check is performed by executing the respective logical form query against one or more databases. The one or more databases can be randomly selected from a plurality of databases. In some instances, if execution of the logical form query against a database returns an empty result, the logical form query can be discarded. In some instances, if execution of the logical form query returns a non-empty result, the WHERE clauses in the logical form query are treated as true and the logical form query is again executed against the database. In some instances, if execution of the logical form query with its WHERE clauses treated as true returns a non-empty result, the logical form query can be included in the synthetic training data; otherwise, the logical form query can be discarded.

In some instances, the constraint check is performed by determining whether the sampled columns of the sampled components used to lexicalize the respective utterance and its corresponding logical form query are consistent with the type of the COLUMN non-terminal symbol in the utterance and delexicalized logical form query prior to lexicalization. For example, a sampled component COLUMN.TEXT should be sampled for a COLUMN.NUMBER non-terminal symbol in the utterance and its corresponding delexicalized logical form query. In some instances, the constraint check is performed by determining whether the sampled columns of the sampled components satisfy one or more conditions based on their respective type and constraints. For example, a column with a COLUMN.NUMBER type with an Aggregatable constraint should be located in the logical form query inside a MAX, MIN, AVG, and COUNT SQL operation. Exemplary column types, constraints, and conditions are listed in Table 6 below.

TABLE 6

| TypeConstraint | Eligible Types | Condition |
| --- | --- | --- |
| Aggregateable | Number<br>Time<br>Currency<br>Age<br>Measure | Column is inside a MAX, MIN, AVG, COUNT operation |
| Requestable | All | Column is requested inside SELECT clause |
| Sortable | Same as aggregateable | Column is used inside these operators (<, >, <=, >=, BETWEEN) |
| Comparable | All except ID | Column is used inside equal and not equal operators |
| Orderable | All | Column is used in order by clause |
| Groupable | All | Column is used in group by clause |
| Filterable | All | Column is used in WHERE clause |

In some instances, a data structure can be generated and the synthesized training data can be organized and stored in the data structure. In some instances, each utterance and its corresponding logical form query in the set of synthetic training examples 914, . . . , 916 can be organized in a predetermined format. In some instances, an exemplary predetermined format is as follows:

```
{
  "nl_lexicalized": "Show all player attributes shot power
with at least 3 player attributes .",
  "sql_lexicalized": "SELECT Player_Attributes.shot_power
FROM Player_Attributes GROUP BY Player_Attributes.shot_power
HAVING Count(*) >= 3.0",
  "template": {
    "nl": "Show all TABLE#0.COLUMN#0 with at least 3
TABLE#0 .",
    "sql": "SELECT TABLE#0.COLUMN#0 FROM TABLE#0 GROUP BY
TABLE#0.COLUMN#0 HAVING Count ( * ) >= 3"
  },
  "mapping": {
    "nl_map": {
      "TABLE#0.COLUMN#0": "player attributes shot
power",
      "TABLE#0": "player attributes"
    },
    "sql_map": {
      "TABLE#0": "Player_Attributes",
      "TABLE#0.COLUMN#0": "shot_power"
    }
  },
  "col_type_constraint": {
    "TABLE#0.COLUMN#0": [
      "SqlTypeConstraint.REQUESTABLE",
      "SqlTypeConstraint.GROUPABLE"
    ]
  },
  "col_type_assignment": {
    "TABLE#0.COLUMN#0": "SqlColumnTypes.NUMBER"
  },
  "value_bound": { },
  "column_bound": { },
}
```

Moreover, upon generating the set of synthetic training examples 914, . . . , 916, the synthetic training examples can be optionally paraphrased at paraphrasing step 4116 to produce paraphrased synthetic training examples. In some instances, the synthetic training examples can be clunky (especially in instances where the natural language utterances are generated from templates). For example, in some instances, some natural language utterances can include nonterminal symbols corresponding to multiple different columns from the same table, which results in a delexicalized utterance with the table name included in multiple instances. In some instances, clunkiness can be reduced by defining a rule to reduce the number of table name mentions in the lexicalized utterance. For example, a rule may be defined for paraphrasing to only allow one mention of table name at the first instance of a COLUMN non-terminal symbol in the utterance from the start of the utterance to the end of the utterance and for any COLUMN non-terminal symbols that appear in the utterance after the first instance, it is assumed that that COLUMN is from the same table as the first instance and an "s" can be added to the COLUMN non-terminal symbol (e.g., COLUMN's). Additionally, if that particular table appears in the natural language examples as a single table mentioned, thus the delexicalized columns that come from that table do not need to mention the table name at all. In some instances, clunkiness can be reduced by sending the set of synthetic training examples 914, . . . , 916 to crowd workers for paraphrasing.

In some instances, synthetic training examples and/or the paraphrased synthetic training examples are combined with the original training data to produce augmented training data. The augmented training data can be used to train one or more natural language to logical form (NL2LF) algorithms. Using the foregoing data manufacturing framework based on templates and a SCFG, additional training data can be generated without the time, effort, and money required to gather and clean data under the conventional approaches. Additionally, using the foregoing data manufacturing framework based on templates and a SCFG, models that perform well on select databases and that can generalize well to new and unseen databases can be built.

Combining the Training Data and Training the Model

The (semi-) automated data augmentation framework disclosed herein works by combining the original training data of the NL2LF model with new data that comes from both the Template-Based Synthetic Data Augmentation and the Augmentation of Existing Training Examples. However, as should be understood, it can be important to choose the right amount of "new" data. Too much new data may lead to forgetting and overgeneralization problems in the NL2LF model. For example, injecting too many examples with keyword "per" in the NL and "GROUP BY" in the OMRQL may lead to the model unexpectedly predicting GROUP-BY on non group-by examples, or they may lead the model to stop predicting "GROUP BY" in the case of other keywords like "for each" or "by" or "grouped by".

To avoid these effects, the (semi-) automated data augmentation framework includes a trainer component (e.g., trainer 755 described with respect to FIG. 7) that tunes the sampling rates for the "new" data (synthetic and modified examples) in order to jointly (1) improve accuracy on targeted test-sets (i.e., test-sets manually crafted to evaluate the specific robustness aspect of the model) and also (2)

minimize regressions on all other model evaluation test-sets. This step ensures that the output NL2LF model from training has an improved behavior on the "robustness" bucket without incurring forgetting and regressions on the existing test cases.

Figure 10:
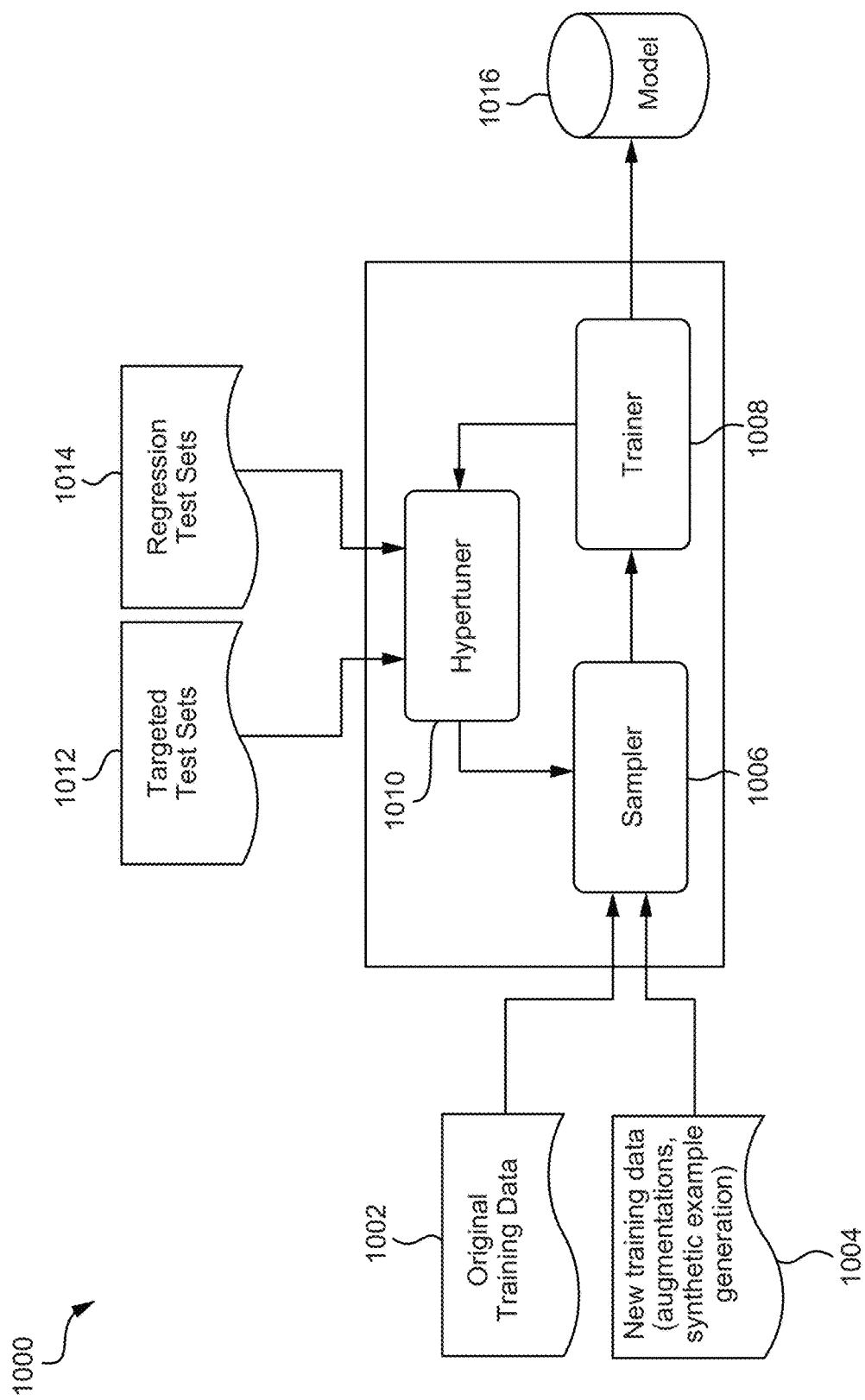
FIG. 10 illustrates a schematic overview of a process for combining the training data and training a machine learning model in accordance with various embodiments.

FIG. 10 is a schematic overview 1000 of a process for combining the training data and training the model in accordance with various embodiments. Original training data 1002 is combined with the new training data 1004 that comes from both the Template-Based Synthetic Data Augmentation (FIG. 9) and the Augmentation of Existing Training Examples (FIG. 8). It is important to choose the right amount of new training data 1004, as too much new training data 1004 may lead to forgetting and overgeneralization problems in the trained NL2LF model 1016. To avoid these effects, the trainer component 1008 tunes sampling rates for the new training data 1004 (synthetic and modified examples) to jointly improve accuracy on targeted test sets 1012 (e.g., test sets manually crafted to evaluate the specific robustness aspect of the model) and minimize regressions on other model evaluation test sets 1014. This ensures that the trained NL2LF model 1016 has an improved robustness without incurring forgetting and regressions on the existing test cases.

A sampler module 1006 combines the new data and the original training data based on sampling rates determined by a hypertuner module 1010. The data is used by the trainer 1008 to train an intermediate trial of the NL2LF model 1016 (i.e., a fully trained NL2LF model 1016 with suboptimal sampling rates). The hypertuner module 1010 iteratively refines the sampling rates (i.e., the percentage of new data with respect to the original training data size) based on the combined NL2LF model accuracies on targeted test sets 1012 (focusing on a specific robustness aspect of the model) and regression sets 1014 to check that the NL2LF model 1016 does not forget any other basic capability.

Flow for Augmenting Training Data

Figure 11:
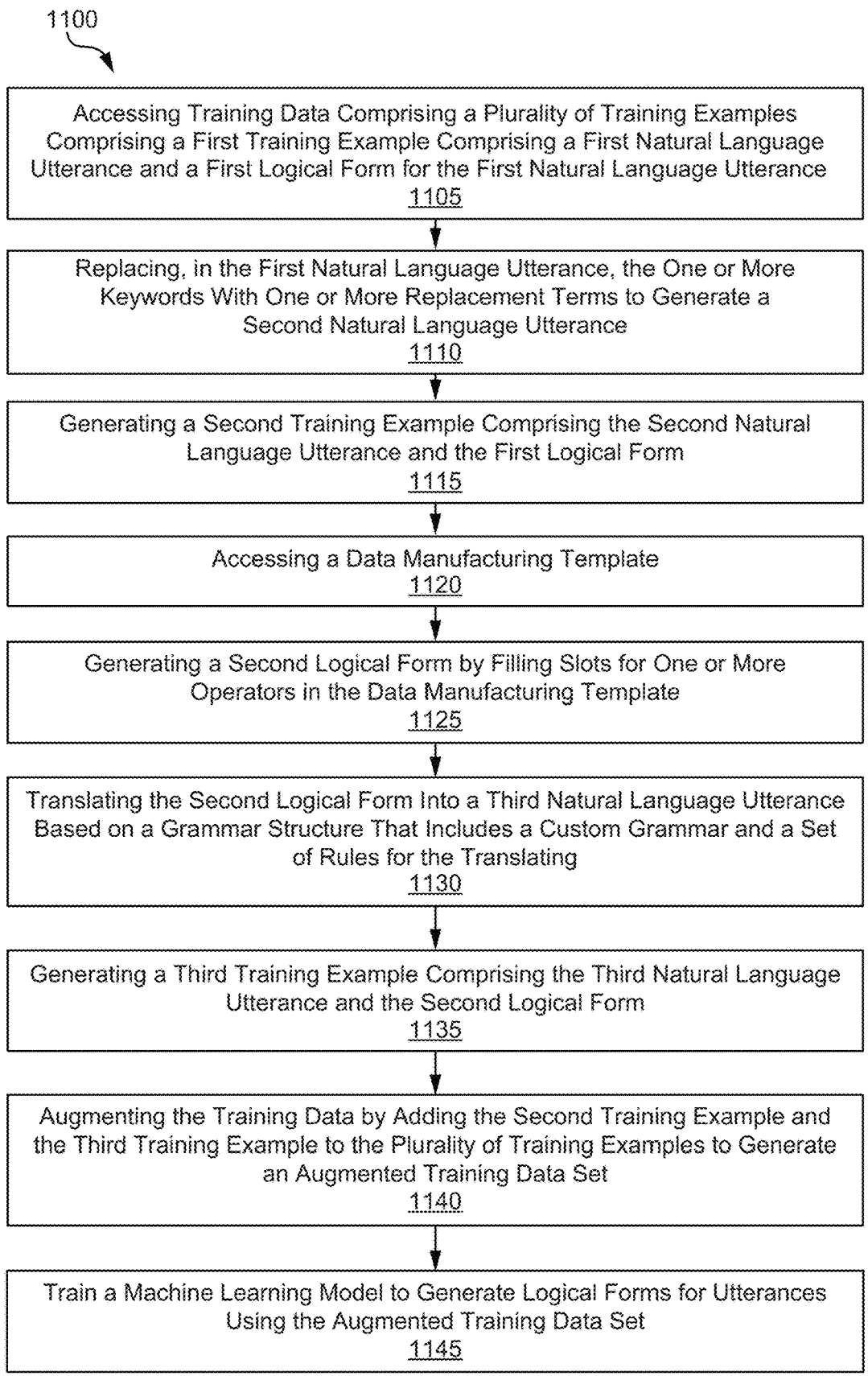
FIG. 11 is a flowchart illustrating a process for augmenting training data in accordance with various embodiments.

FIG. 11 is a flowchart illustrating a process 1100 for augmenting training data in accordance with various embodiments. The processing depicted in FIG. 11 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain alternative embodiments, the steps may be performed in some different order, or some steps may also be performed in parallel. In certain embodiments, such as in the embodiments depicted in FIGS. 1-10, the processing depicted in FIG. 11 may be performed by a model system (e.g., model system 600) and (semi-) automated data augmentation framework to create, train, update, and deploy one or more machine-learning models configured for translating natural language to logical form.

At step 1105, training data is accessed. The training data comprises a plurality of training examples comprising a first training example. The first training example comprises a first natural language utterance and a first logical form for the first natural language utterance. The first natural language utterance comprises one or more keywords (e.g., keyword "per", operators in the NL (e.g., "<=", ">=", "<", . . . , keyword "having", and the like) associated with a target robustness bucket. As described herein, a machine learning model may show high error rates when the input utterances include keywords, phrasings, or constructs that are present only in few training examples or totally absent in the model training set. By generating additional training examples in a desired robustness bucket that includes these keywords, phrasings, or constructs and then re-training the model based on the additional training examples, the performance of the machine learning model on utterances that include these keywords, phrasings, or constructs is improved.

Augmentation of Existing Training Examples, as described above with respect to FIG. 8, and Template-Based Synthetic Data Augmentation, as described above with respect to FIG. 9, are then performed. Steps 1110-1115 are used to perform Augmentation of Existing Training Examples. Steps 1120-1135 are used to perform Template-Based Synthetic Data Augmentation.

At step 1110, the one or more keywords in the first natural language utterance are replace with one or more replacement terms sampled from a list of replacement terms to generate a second natural language utterance.

In some instances, accessing the training data comprises identifying, from the plurality of training examples, a set of target training examples that match patterns comprising the one or more keywords or the one or more of the operators associated with the target robustness bucket. The set of target training examples comprise the first training example.

In some instances, the first training example comprises the first natural language utterance, the first logical form for the first natural language utterance, and metadata associated with the first natural language utterance. In some instances, generating the second training example comprises modifying the metadata associated with the first natural language utterance to generate updated metadata associated with the second natural language utterance, and modifying the metadata comprises adjusting an offset value for schema linking to reflect values in the second natural language utterance.

At step 1115, a second training example comprising the second natural language utterance and the first logical form is generated. In some instances, the second training example is generated by appending (e.g., associating in a table or database) the second natural language utterance with the first logical form.

At step 1120, a data manufacturing template is accessed that defines structure of a system operation (e.g., a database operation such as a database query) and constraints imposed on operators (e.g., database operators such as SELECT AVG, FROM, GROUP BY, WHERE etc.) of the system operation.

At step 1125, a second logical form is generated by filling slots for one or more of the operators in the data manufacturing template based on a schema and values for a system. The one or more of the operators are associated with the target robustness bucket.

In some instances, the data manufacturing template comprises a delexicalized version of the second logical form and filling the slots comprises: parsing the data manufacturing template, sampling the system and schema to identify a plurality of sampling components comprising the values, and lexicalizing the slots of the data manufacturing template with at least one sampling component of the plurality of sampling components.

In some instances, the data manufacturing template is parsed by applying a synchronous context-free grammar to the delexicalized version of the second logical form to generate an abstract syntax tree for the data manufacturing template, and lexicalizing the data manufacturing template comprises analyzing the data manufacturing template to identify the constraints imposed on the operators and lexicalizing the slots of the data manufacturing template with at least one sampling component of the plurality of sampling components based on the identified constraints.

At step 1130, the second logical form is translated into a third natural language utterance based on a grammar data structure that includes a custom grammar and a set of rules for translating logical form statements into corresponding natural language expressions comprising one or more target keywords. The custom grammar comprises target keywords including the replacement terms from the list of replacement terms, which are used to control the translating such that the natural language utterances will contain on or more of the target keywords.

In some instances, translating the second logical form into a third natural language utterance comprises: converting the second logical form into a logical form structure comprising one or more logical form statements, where the converting comprises extracting one or more operations and associated one or more attributes from the second logical form and generating the one or more logical form statements from the one or more operations and associated one or more attributes. In some instances, translating the second logical form into a third natural language utterance further comprises: translating each of the one or more logical form statements into a natural language expression based on the grammar data structure; combining the one or more natural language expressions into the third natural language utterance; and providing third natural language utterance as an interpretation of the second logical form.

At step 1135, a third training example comprising the second logical form and the third natural language utterance is generated. In some instances, the third training example is generated by appending (e.g., associating in a table or database) the second logical form with the third natural language utterance.

At step 1140, the training data is augmented by adding the second training example and the third training example to the plurality of training examples to generate an augmented training data set.

At step 1145, a machine learning model is trained to generate logical forms for utterances using the augmented training data set. In some instances, the logical forms are C2OMRL or OMRQL queries.

In some instances, the augmented training data set is sampled to ensure that an appropriate amount of the original and new training data is used, as described above with respect to FIG. 10. Training the machine learning model using the augmented training data set includes sampling training values from the augmented training data set based on a sampling rate and training the machine learning model using the sampled training values. For example, the sampling rate for the new data (including the augmentation examples) is tuned to improve accuracy on targeted test sets and minimize regressions on other model evaluation test sets. The new data and original training data are combined based on the sampling rates determined.

In some instances, the machine learning model is deployed to generate the database query comprising the database operation. In some examples, deploying the machine learning model includes providing an input utterance to the machine learning model, and processing the input utterance to generate a logical form, for example, a C2OMRL or OMRQL query or system query such as a SQL database query.

Experimental Results

The data augmentation techniques described above provide significant accuracy improvement compared to models trained without the augmented data. Examples of the new training data produced by the framework described herein to address the robustness issues of a previous C2OMRL model are shown in Table 7. The model accuracy improvements between a C2OMRL model previously trained on original training data and a C2OMRL model subsequently trained on the new training data produced by the framework are shown in Table 8 and demonstrate the at least the model accuracy benefit from the framework.

TABLE 7

| | Robustness Issue | From augmentation of existing training examples | From synthetic data manufacturing |
|---|---|---|---|
| | | New training data examples | |
| 1 | Model does not reliably recognise the keyword "per" as trigger for "GROUP BY" | Original = "How many people are there for each country?" Augmented = "How many people are there per country?" | Generated = "Show average payment amount per payment method code." → SELECT AVG(payment_amount), payment_method_code FROM payments GROUP BY payment_method_code |
| 2 | Model does not reliably handle operators in the NL (e.g., "<=", ">=", "<", . . .) | Original = "What are the names and types of the dorms that have a capacity more than 300 or less than 100?" Augmented = "What are the names and types of the dorms that have a capacity >300 or <100?" | Generated = "show account name where transaction amount >= 1000 and <= 5000" → SELECT account_name FROM Accounts WHERE transaction_amount >= 1000 AND transaction_amount <= 5000 |
| 3 | Model does not reliably recognise the keyword "having" as trigger for "HAVING" | Original = "What are the ids and names of accounts with 4 or more transactions?" Augmented = "What are the ids and names of accounts having 4 or more transactions?" | Generated = "Show the artist name having the highest song rating <7" → SELECT artist_name FROM artist HAVING AVG(rating) <7 |

TABLE 8

| Test-set | C2OMRL Model accuracy (previous) | C2OMRL Model accuracy (subsequent) |
| --- | --- | --- |
| groupby_keyword_per examples with keyword "per" expected to trigger "GROUP BY" | 83% | 91% |
| operators_as_keywords examples with operators "<, >, >=, <=, =" in the NL | 69% | 90% |
| groupby_keyword_having examples with keyword "having" expected to trigger "GROUP BY HAVING . . . " | 49% | 87% |
| regression_sets evaluate C2OMRL model basic capabilities | 89% | 90% (no regression) |

Illustrative Systems

Figure 12:
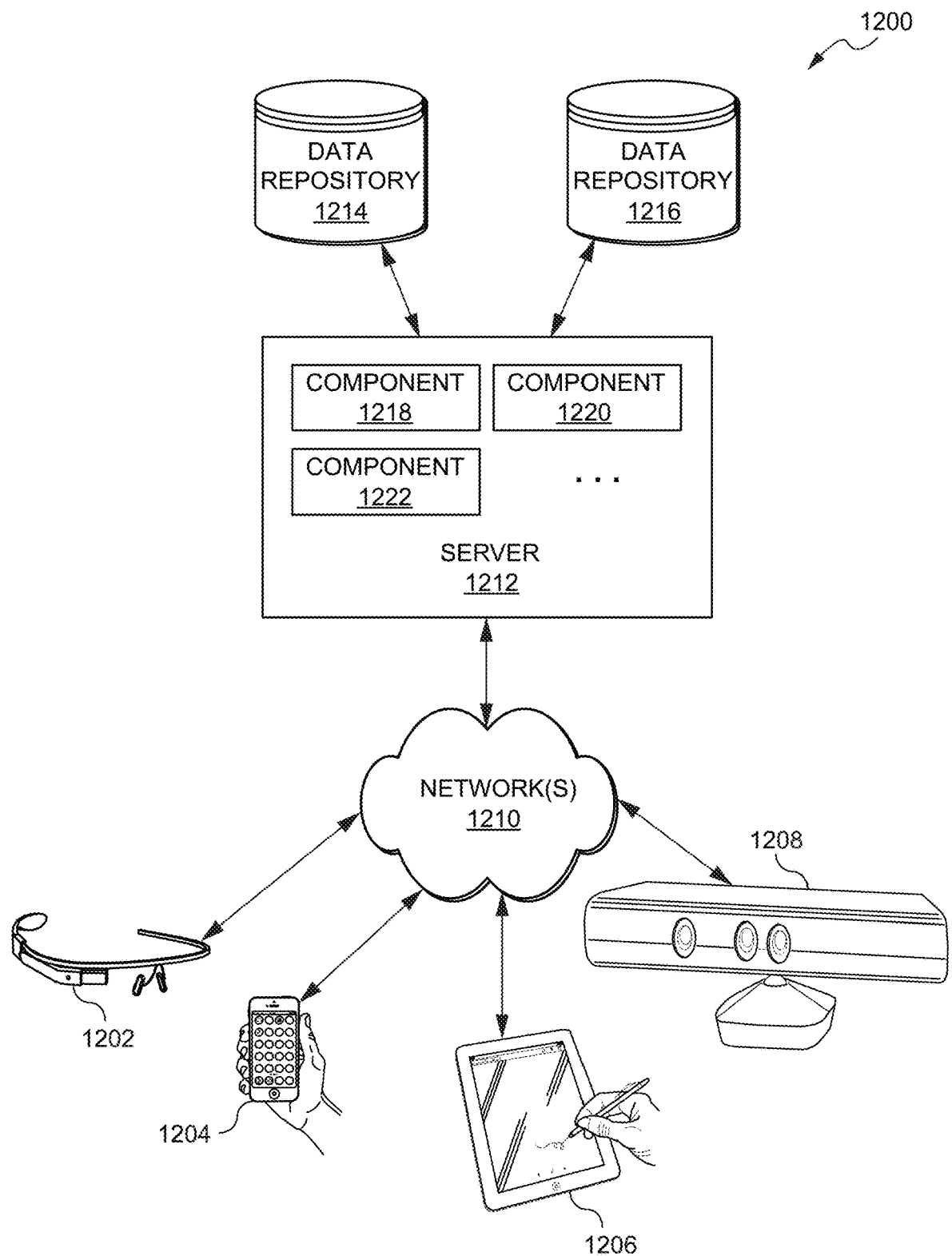
FIG. 12 depicts a simplified diagram of a distributed system for implementing various embodiments.

FIG. 12 depicts a simplified diagram of a distributed system 1200. In the illustrated example, distributed system 1200 includes one or more client computing devices 1202, 1204, 1206, and 1208, coupled to a server 1212 via one or more communication networks 1210. Clients computing devices 1202, 1204, 1206, and 1208 may be configured to execute one or more applications.

In various examples, server 1212 may be adapted to run one or more services or software applications that enable one or more embodiments described in this disclosure. In certain examples, server 1212 may also provide other services or software applications that may include non-virtual and virtual environments. In some examples, these services may be offered as web-based or cloud services, such as under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in FIG. 12, server 1212 may include one or more components 1218, 1220 and 1222 that implement the functions performed by server 1212. These components may include software components that may be executed by one or more processors, hardware components, or combinations thereof. It should be appreciated that various different system configurations are possible, which may be different from distributed system 1200. The example shown in FIG. 12 is thus one example of a distributed system for implementing an example system and is not intended to be limiting.

Users may use client computing devices 1202, 1204, 1206, and/or 1208 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 12 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows® Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1210 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1210 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1212 may include one or more virtual machines running virtual operating systems, or other computing architectures involving virtualization such as one or more flexible pools of logical storage devices that may be virtualized to maintain virtual storage devices for the server. In various examples, server 1212 may be adapted to run one or more services or software applications that provide the functionality described in the foregoing disclosure.

The computing systems in server 1212 may run one or more operating systems including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more data repositories 1214, 1216. These data repositories may be used to store data and other information in certain examples. For example, one or more of the data repositories 1214, 1216 may be used to store information such as information related to chatbot performance or generated models for use by chatbots used by server 1212 when performing various functions in accordance with various embodiments. Data repositories 1214, 1216 may reside in a variety of locations. For example, a data repository used by server 1212 may be local to server 1212 or may be remote from server 1212 and in communication with server 1212 via a network-based or dedicated connection. Data repositories 1214, 1216 may be of different types. In certain examples, a data repository used by server 1212 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1214, 1216 may also be used by applications to store application data. The data repositories used by applications may be of different types such as, for example, a key-value store repository, an object store repository, or a general storage repository supported by a file system.

Figure 13:
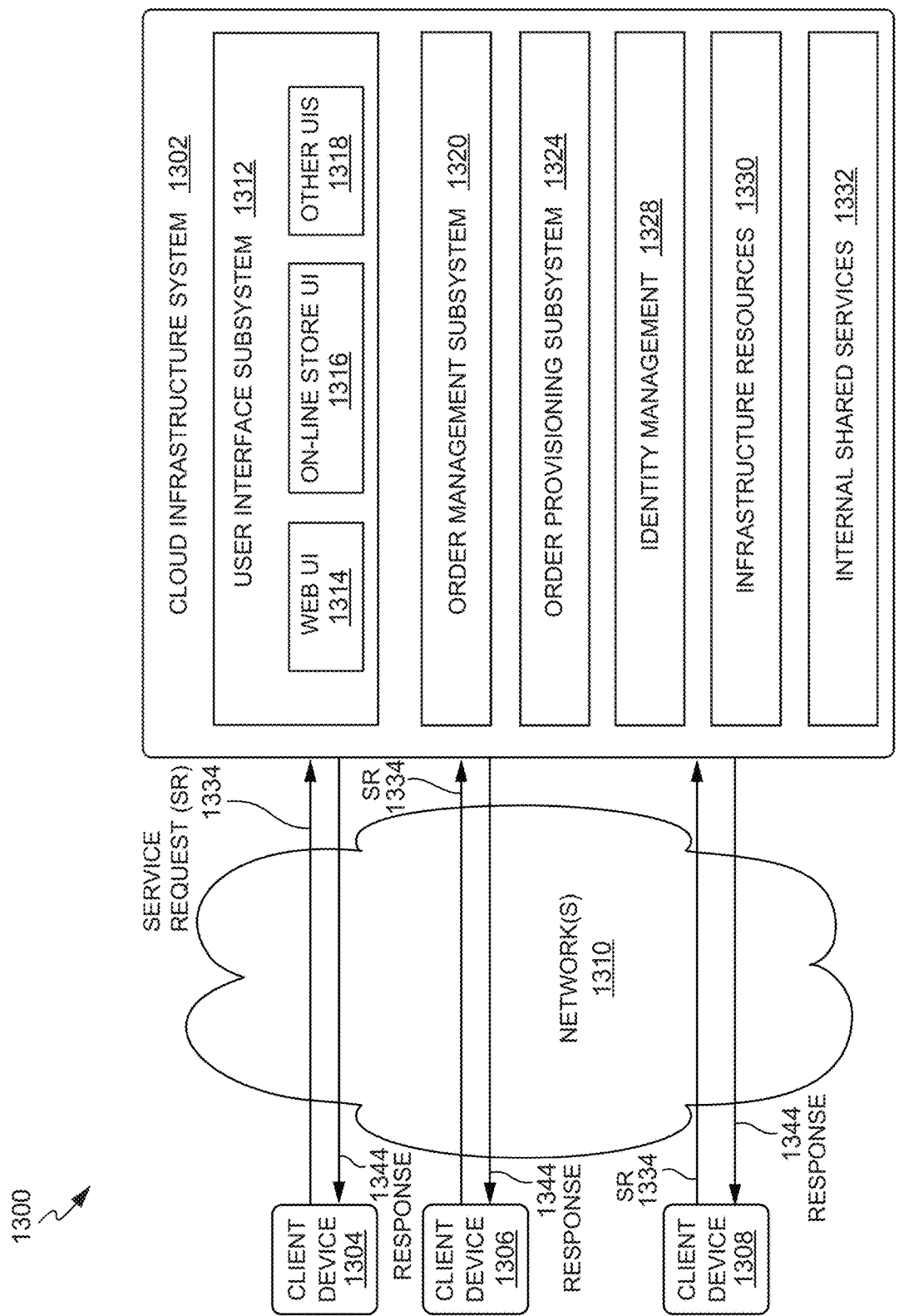
FIG. 13 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 13 is a simplified block diagram of a cloud-based system environment in which various services may be offered as cloud services in accordance with certain examples. In the example depicted in FIG. 13, cloud infrastructure system 1302 may provide one or more cloud services that may be requested by users using one or more client computing devices 1304, 1306, and 1308. Cloud infrastructure system 1302 may comprise one or more computers and/or servers that may include those described above for server 1212. The computers in cloud infrastructure system 1302 may be organized as general purpose computers, specialized server computers, server farms, server clusters, or any other appropriate arrangement and/or combination.

Network(s) 1310 may facilitate communication and exchange of data between clients 1304, 1306, and 1308 and cloud infrastructure system 1302. Network(s) 1310 may include one or more networks. The networks may be of the same or different types. Network(s) 1310 may support one or more communication protocols, including wired and/or wireless protocols, for facilitating the communications.

The example depicted in FIG. 13 is only one example of a cloud infrastructure system and is not intended to be limiting. It should be appreciated that, in some other examples, cloud infrastructure system 1302 may have more or fewer components than those depicted in FIG. 13, may combine two or more components, or may have a different configuration or arrangement of components. For example, although FIG. 13 depicts three client computing devices, any number of client computing devices may be supported in alternative examples.

The term cloud service is generally used to refer to a service that is made available to users on demand and via a communication network such as the Internet by systems (e.g., cloud infrastructure system 1302) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1302 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1302 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1302. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1302. Cloud infrastructure system 1302 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1302 may be configured to provide one or even multiple cloud services.

Cloud infrastructure system 1302 may provide the cloud services via different deployment models. In a public cloud model, cloud infrastructure system 1302 may be owned by a third party cloud services provider and the cloud services are offered to any general public customer, where the customer may be an individual or an enterprise. In certain other examples, under a private cloud model, cloud infrastructure system 1302 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1302 and the services provided may be shared by several organizations in a related community. Various other models such as hybrids of the above mentioned models may also be used.

Client computing devices 1304, 1306, and 1308 may be of different types (such as client computing devices 1202, 1204, 1206, and 1208 depicted in FIG. 12) and may be capable of operating one or more client applications. A user may use a client device to interact with cloud infrastructure system 1302, such as to request a service provided by cloud infrastructure system 1302. For example, a user may use a client device to request information or action from a chatbot as described in this disclosure.

In some examples, the processing performed by cloud infrastructure system 1302 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1302 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 13, cloud infrastructure system 1302 may include infrastructure resources 1330 that are utilized for facilitating the provision of various cloud services offered by cloud infrastructure system 1302. Infrastructure resources 1330 may include, for example, processing resources, storage or memory resources, networking resources, and the like. In certain examples, the storage virtual machines that are available for servicing storage requested from applications may be part of cloud infrastructure system 1302. In other examples, the storage virtual machines may be part of different systems.

In certain examples, to facilitate efficient provisioning of these resources for supporting the various cloud services provided by cloud infrastructure system 1302 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1302 may itself internally use services 1332 that are shared by different components of cloud infrastructure system 1302 and which facilitate the provisioning of services by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1302 may comprise multiple subsystems. These subsystems may be implemented in software, or hardware, or combinations thereof. As depicted in FIG. 13, the subsystems may include a user interface subsystem 1312 that enables users or customers of cloud infrastructure system 1302 to interact with cloud infrastructure system 1302. User interface subsystem 1312 may include various different interfaces such as a web interface 1314, an online store interface 1316 where cloud services provided by cloud infrastructure system 1302 are advertised and are purchasable by a consumer, and other interfaces 1318. For example, a customer may, using a client device, request (service request 1334) one or more services provided by cloud infrastructure system 1302 using one or more of interfaces 1314, 1316, and 1318. For example, a customer may access the online store, browse cloud services offered by cloud infrastructure system 1302, and place a subscription order for one or more services offered by cloud infrastructure system 1302 that the customer wishes to subscribe to. The service request may include information identifying the customer and one or more services that the customer desires to subscribe to. For example, a customer may place a subscription order for a service offered by cloud infrastructure system 1302. As part of the order, the customer may provide information identifying a chatbot system for which the service is to be provided and optionally one or more credentials for the chatbot system.

In certain examples, such as the example depicted in FIG. 13, cloud infrastructure system 1302 may comprise an order management subsystem (OMS) 1320 that is configured to process the new order. As part of this processing, OMS 1320 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1320 may then invoke the order provisioning subsystem (OPS) 1324 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1324 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1302 as part of the provisioning process. Cloud infrastructure system 1302 may generate an application ID and select a storage virtual machine for an application from among storage virtual machines provided by cloud infrastructure system 1302 itself or from storage virtual machines provided by other systems other than cloud infrastructure system 1302.

Cloud infrastructure system 1302 may send a response or notification 1344 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1302 and information identifying a chatbot system selected by cloud infrastructure system 1302 for the chatbot system corresponding to the chatbot system ID.

Cloud infrastructure system 1302 may provide services to multiple customers. For each customer, cloud infrastructure system 1302 is responsible for managing information related to one or more subscription orders received from the customer, maintaining customer data related to the orders, and providing the requested services to the customer. Cloud infrastructure system 1302 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1302 may provide services to multiple customers in parallel. Cloud infrastructure system 1302 may store information for these customers, including possibly proprietary information. In certain examples, cloud infrastructure system 1302 comprises an identity management subsystem (IMS) 1328 that is configured to manage customer information and provide the separation of the managed information such that information related to one customer is not accessible by another customer. IMS 1328 may be configured to provide various security-related services such as identity services, such as information access management, authentication and authorization services, services for managing customer identities and roles and related capabilities, and the like.

Figure 14:
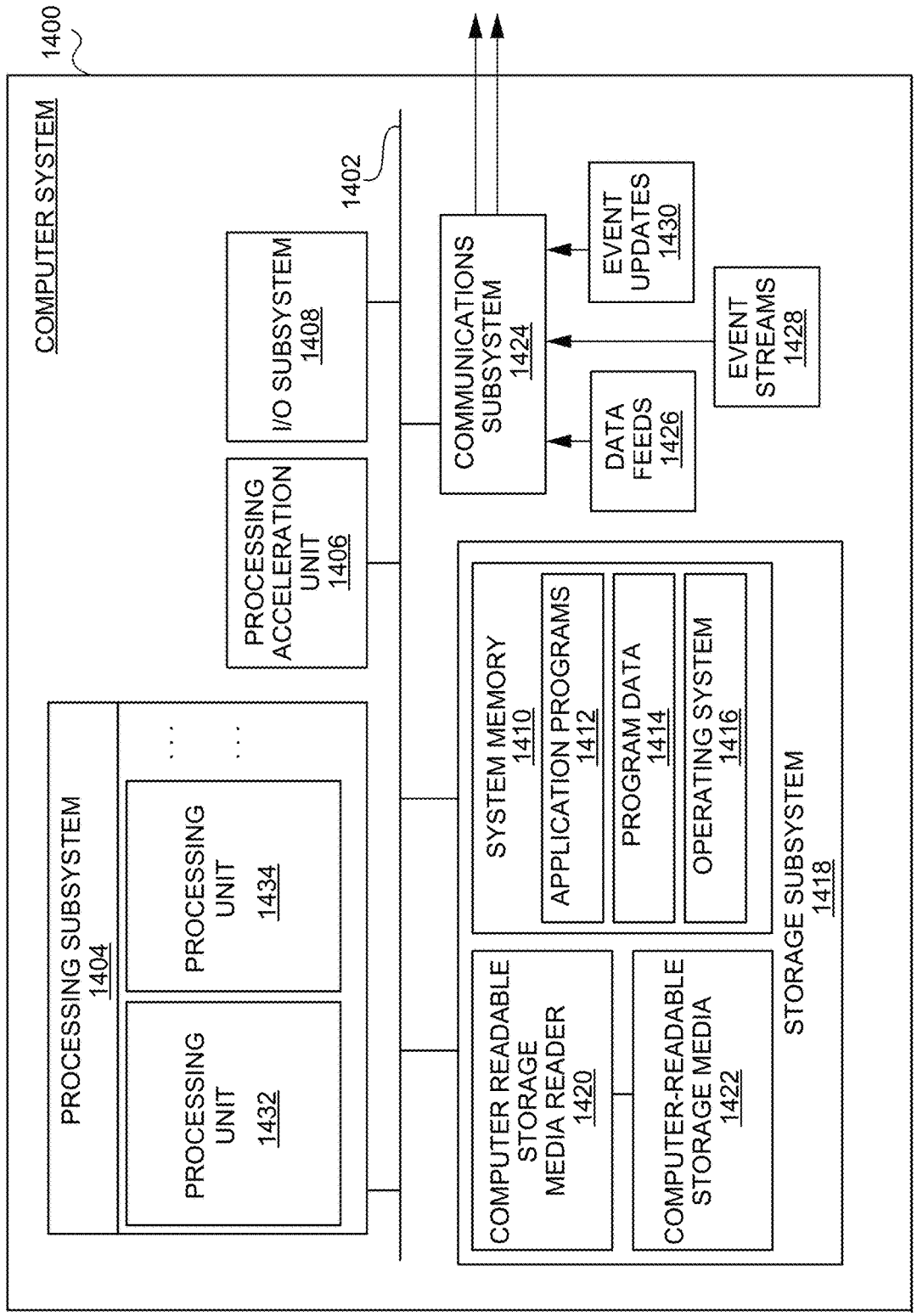
FIG. 14 illustrates an example computer system that may be used to implement various embodiments.

FIG. 14 illustrates an example of computer system 1400. In some examples, computer system 1400 may be used to implement any of the digital assistant or chatbot systems within a distributed environment, and various servers and computer systems described above. As shown in FIG. 14, computer system 1400 includes various subsystems including a processing subsystem 1404 that communicates with a number of other subsystems via a bus subsystem 1402. These other subsystems may include a processing acceleration unit 1406, an I/O subsystem 1408, a storage subsystem 1418, and a communications subsystem 1424. Storage subsystem 1418 may include non-transitory computer-readable storage media including storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative examples of the bus subsystem may utilize multiple buses. Bus subsystem 1402 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1404 controls the operation of computer system 1400 and may comprise one or more processors, application specific integrated circuits (ASICs), or field programmable gate arrays (FPGAs). The processors may include be single core or multicore processors. The processing resources of computer system 1400 may be organized into one or more processing units 1432, 1434, etc. A processing unit may include one or more processors, one or more cores from the same or different processors, a combination of cores and processors, or other combinations of cores and processors. In some examples, processing subsystem 1404 may include one or more special purpose co-processors such as graphics processors, digital signal processors (DSPs), or the like. In some examples, some or all of the processing units of processing subsystem 1404 may be implemented using customized circuits, such as application specific integrated circuits (ASICs), or field programmable gate arrays (FPGAs).

In some examples, the processing units in processing subsystem 1404 may execute instructions stored in system memory 1410 or on computer readable storage media 1422. In various examples, the processing units may execute a variety of programs or code instructions and may maintain multiple concurrently executing programs or processes. At any given time, some or all of the program code to be executed may be resident in system memory 1410 and/or on computer-readable storage media 1422 including potentially on one or more storage devices. Through suitable programming, processing subsystem 1404 may provide various functionalities described above. In instances where computer system 1400 is executing one or more virtual machines, one or more processing units may be allocated to each virtual machine.

In certain examples, a processing acceleration unit 1406 may optionally be provided for performing customized processing or for off-loading some of the processing performed by processing subsystem 1404 so as to accelerate the overall processing performed by computer system 1400.

I/O subsystem 1408 may include devices and mechanisms for inputting information to computer system 1400 and/or for outputting information from or via computer system 1400. In general, use of the term input device is intended to include all possible types of devices and mechanisms for inputting information to computer system 1400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1400 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1418 provides a repository or data store for storing information and data that is used by computer system 1400. Storage subsystem 1418 provides a tangible non-transitory computer-readable storage medium for storing the basic programming and data constructs that provide the functionality of some examples. Storage subsystem 1418 may store software (e.g., programs, code modules, instructions) that when executed by processing subsystem 1404 provides the functionality described above. The software may be executed by one or more processing units of processing subsystem 1404. Storage subsystem 1418 may also provide authentication in accordance with the teachings of this disclosure.

Storage subsystem 1418 may include one or more non-transitory memory devices, including volatile and non-volatile memory devices. As shown in FIG. 14, storage subsystem 1418 includes a system memory 1410 and a computer-readable storage media 1422. System memory 1410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1400, such as during start-up, may typically be stored in the ROM. The RAM typically contains data and/or program modules that are presently being operated and executed by processing subsystem 1404. In some implementations, system memory 1410 may include multiple different types of memory, such as static random access memory (SRAM), dynamic random access memory (DRAM), and the like.

By way of example, and not limitation, as depicted in FIG. 14, system memory 1410 may load application programs 1412 that are being executed, which may include various applications such as Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1422 may store programming and data constructs that provide the functionality of some examples. Computer-readable media 1422 may provide storage of computer-readable instructions, data structures, program modules, and other data for computer system 1400. Software (programs, code modules, instructions) that, when executed by processing subsystem 1404 provides the functionality described above, may be stored in storage subsystem 1418. By way of example, computer-readable storage media 1422 may include non-volatile memory such as a hard disk drive, a magnetic disk drive, an optical disk drive such as a CD ROM, DVD, a Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1418 may also include a computer-readable storage media reader 1420 that may further be connected to computer-readable storage media 1422. Reader 1420 may receive and be configured to read data from a memory device such as a disk, a flash drive, etc.

In certain examples, computer system 1400 may support virtualization technologies, including but not limited to virtualization of processing and memory resources. For example, computer system 1400 may provide support for executing one or more virtual machines. In certain examples, computer system 1400 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1400. Accordingly, multiple operating systems may potentially be run concurrently by computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to establish a communication channel to one or more client devices via the Internet for receiving and sending information from and to the client devices. For example, when computer system 1400 is used to implement bot system 120 depicted in FIG. 1, the communication subsystem may be used to communicate with a chatbot system selected for an application.

Communication subsystem 1424 may support both wired and/or wireless communication protocols. In certain examples, communications subsystem 1424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1424 may provide wired network connectivity (e.g., Ethernet) in addition to or instead of a wireless interface.

Communication subsystem 1424 may receive and transmit data in various forms. In some examples, in addition to other forms, communications subsystem 1424 may receive input communications in the form of structured and/or unstructured data feeds 1426, event streams 1428, event updates 1430, and the like. For example, communications subsystem 1424 may be configured to receive (or send) data feeds 1426 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1424 may be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1424 may also be configured to communicate data from computer system 1400 to other computer systems or networks. The data may be communicated in various different forms such as structured and/or unstructured data feeds 1426, event streams 1428, event updates 1430, and the like to one or more databases that may be in communication with one or more streaming data source computers coupled to computer system 1400.

Computer system 1400 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1400 depicted in FIG. 14 is intended only as a specific example. Many other configurations having more or fewer components than the system depicted in FIG. 14 are possible. Based on the disclosure and teachings provided herein, it should be appreciated there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
accessing training data comprising a plurality of training examples comprising a first training example, wherein the first training example comprises a first natural language utterance and a first logical form for the first natural language utterance, and wherein the first natural language utterance comprises one or more keywords associated with a target robustness bucket;
replacing, in the first natural language utterance, the one or more keywords with one or more replacement terms sampled from a list of replacement terms to generate a second natural language utterance;
generating a second training example comprising the second natural language utterance and the first logical form;
accessing a data manufacturing template that defines structure of a system operation and constraints imposed on operators of the system operation;
generating a second logical form by filling slots for one or more of the operators in the data manufacturing template based on a schema and values for a system, wherein the one or more of the operators are associated with the target robustness bucket;
translating the second logical form into a third natural language utterance based on a grammar data structure that includes a custom grammar and a set of rules for translating logical form statements into corresponding natural language expressions comprising one or more target keywords, wherein the custom grammar comprises target keywords including the replacement terms from the list of replacement terms, which are used to control the translating such that natural language utterances will contain one or more of the target keywords;
generating a third training example comprising the second logical form and the third natural language utterance;
augmenting the training data by adding the second training example and the third training example to the plurality of training examples to generate an augmented training data set; and
training a machine learning model to generate logical forms for utterances using the augmented training data set.

2. The computer-implemented method of claim 1, wherein accessing the training data comprises identifying, from the plurality of training examples, a set of target training examples that match patterns comprising the one or more keywords or the one or more of the operators associated with the target robustness bucket, wherein the set of target training examples comprises the first training example.

3. The computer-implemented method of claim 1, wherein the first training example comprises the first natural language utterance, the first logical form for the first natural language utterance, and metadata associated with the first natural language utterance, wherein generating the second training example comprises modifying the metadata associated with the first natural language utterance to generate updated metadata associated with the second natural language utterance, and wherein modifying the metadata comprises adjusting an offset value for schema linking to reflect values in the second natural language utterance.

4. The computer-implemented method of claim 1, wherein the data manufacturing template comprises a delexicalized version of the second logical form and filling the slots comprises: parsing the data manufacturing template, sampling the system and schema to identify a plurality of sampling components comprising the values, and lexicalizing the slots of the data manufacturing template with at least one sampling component of the plurality of sampling components.

5. The computer-implemented method of claim 4, wherein the data manufacturing template is parsed by applying a synchronous context-free grammar to the delexicalized version of the second logical form to generate an abstract syntax tree for the data manufacturing template, and lexicalizing the data manufacturing template comprises analyzing the data manufacturing template to identify the constraints imposed on the operators and lexicalizing the slots of the data manufacturing template with at least one sampling component of the plurality of sampling components based on the identified constraints.

6. The computer-implemented method of claim 1, wherein translating the second logical form into a third natural language utterance comprises:
 converting the second logical form into a logical form structure comprising one or more logical form statements, wherein the converting comprises extracting one or more operations and associated one or more attributes from the second logical form and generating the one or more logical form statements from the one or more operations and associated one or more attributes;
 translating each of the one or more logical form statements into a natural language expression based on the grammar data structure;
 combining the one or more natural language expressions into the third natural language utterance; and
 providing the third natural language utterance as an interpretation of the second logical form.

7. The computer-implemented method of claim 1, wherein training the machine learning model using the augmented training data set comprises:
 sampling training values from the augmented training data set based on a sampling rate; and
 training the machine learning model using the sampled training values.

8. A system comprising:
 one or more processors; and
 one or more computer-readable media storing instructions which, when executed by the one or more processors, cause the system to perform operations comprising:
 accessing training data comprising a plurality of training examples comprising a first training example, wherein the first training example comprises a first natural language utterance and a first logical form for the first natural language utterance, and wherein the first natural language utterance comprises one or more keywords associated with a target robustness bucket;
 replacing, in the first natural language utterance, the one or more keywords with one or more replacement terms sampled from a list of replacement terms to generate a second natural language utterance;
 generating a second training example comprising the second natural language utterance and the first logical form;
 accessing a data manufacturing template that defines structure of a system operation and constraints imposed on operators of the system operation;
 generating a second logical form by filling slots for one or more of the operators in the data manufacturing template based on a schema and values for a system, wherein the one or more of the operators are associated with the target robustness bucket;
 translating the second logical form into a third natural language utterance based on a grammar data structure that includes a custom grammar and a set of rules for translating logical form statements into corresponding natural language expressions comprising one or more target keywords, wherein the custom grammar comprises target keywords including the replacement terms from the list of replacement terms, which are used to control the translating such that natural language utterances will contain one or more of the target keywords;
 generating a third training example comprising the second logical form and the third natural language utterance;
 augmenting the training data by adding the second training example and the third training example to the plurality of training examples to generate an augmented training data set; and
 training a machine learning model to generate logical forms for utterances using the augmented training data set.

9. The system of claim 8, wherein accessing the training data comprises identifying, from the plurality of training examples, a set of target training examples that match patterns comprises the one or more keywords or the one or more of the operators associated with the target robustness bucket, wherein the set of target training examples comprise the first training example.

10. The system of claim 8, wherein the first training example comprises the first natural language utterance, the first logical form for the first natural language utterance, and metadata associated with the first natural language utterance, wherein generating the second training example comprises modifying the metadata associated with the first natural language utterance to generate updated metadata associated with the second natural language utterance, and wherein modifying the metadata comprises adjusting an offset value for schema linking to reflect values in the second natural language utterance.

11. The system of claim 8, wherein the data manufacturing template comprises a delexicalized version of the second logical form and filling the slots comprises: parsing the data manufacturing template, sampling the system and schema to identify a plurality of sampling components comprising the values, and lexicalizing the slots of the data manufacturing template with at least one sampling component of the plurality of sampling components.

12. The system of claim 11, wherein the data manufacturing template is parsed by applying a synchronous context-free grammar to the delexicalized version of the second logical form to generate an abstract syntax tree for the data manufacturing template, and lexicalizing the data manufacturing template comprises analyzing the data manufacturing template to identify the constraints imposed on the operators and lexicalizing the slots of the data manufacturing template with at least one sampling component of the plurality of sampling components based on the identified constraints.

13. The system of claim 8, wherein translating the second logical form into a third natural language utterance comprises:
 converting the second logical form into a logical form structure comprising one or more logical form statements, wherein the converting comprises extracting one or more operations and associated one or more attributes from the second logical form and generating the one or more logical form statements from the one or more operations and associated one or more attributes;

translating each of the one or more logical form statements into a natural language expression based on the grammar data structure;
combining the one or more natural language expressions into the third natural language utterance; and
providing the third natural language utterance as an interpretation of the second logical form.

14. The system of claim 8, wherein training the machine learning model using the augmented training data set comprises:
sampling training values from the augmented training data set based on a sampling rate; and
training the machine learning model using the sampled training values.

15. One or more non-transitory computer-readable media storing instructions which, when executed by one or more processors, cause a system to perform operations comprising:
accessing training data comprising a plurality of training examples comprising a first training example, wherein the first training example comprises a first natural language utterance and a first logical form for the first natural language utterance, and wherein the first natural language utterance comprises one or more keywords associated with a target robustness bucket;
replacing, in the first natural language utterance, the one or more keywords with one or more replacement terms sampled from a list of replacement terms to generate a second natural language utterance;
generating a second training example comprising the second natural language utterance and the first logical form;
accessing a data manufacturing template that defines structure of a system operation and constraints imposed on operators of the system operation;
generating a second logical form by filling slots for one or more of the operators in the data manufacturing template based on a schema and values for a system, wherein the one or more of the operators are associated with the target robustness bucket;
translating the second logical form into a third natural language utterance based on a grammar data structure that includes a custom grammar and a set of rules for translating logical form statements into corresponding natural language expressions comprising one or more target keywords, wherein the custom grammar comprises target keywords including the replacement terms from the list of replacement terms, which are used to control the translating such that natural language utterances will contain one or more of the target keywords;
generating a third training example comprising the second logical form and the third natural language utterance;
augmenting the training data by adding the second training example and the third training example to the plurality of training examples to generate an augmented training data set; and
training a machine learning model to generate logical forms for utterances using the augmented training data set.

16. The one or more non-transitory computer-readable media of claim 15, wherein accessing the training data comprises identifying, from the plurality of training examples, a set of target training examples that match patterns comprising the one or more keywords or the one or more of the operators associated with the target robustness bucket, wherein the set of target training examples comprises the first training example.

17. The one or more non-transitory computer-readable media of claim 15, wherein the first training example comprises the first natural language utterance, the first logical form for the first natural language utterance, and metadata associated with the first natural language utterance, wherein generating the second training example comprises modifying the metadata associated with the first natural language utterance to generate updated metadata associated with the second natural language utterance, and wherein modifying the metadata comprises adjusting an offset value for schema linking to reflect values in the second natural language utterance.

18. The one or more non-transitory computer-readable media of claim 15, wherein the data manufacturing template comprises a delexicalized version of the second logical form and filling the slots comprises: parsing the data manufacturing template, sampling the system and schema to identify a plurality of sampling components comprising the values, and lexicalizing the slots of the data manufacturing template with at least one sampling component of the plurality of sampling components.

19. The one or more non-transitory computer-readable media of claim 18, wherein the data manufacturing template is parsed by applying a synchronous context-free grammar to the delexicalized version of the second logical form to generate an abstract syntax tree for the data manufacturing template, and lexicalizing the data manufacturing template comprises analyzing the data manufacturing template to identify the constraints imposed on the operators and lexicalizing the slots of the data manufacturing template with at least one sampling component of the plurality of sampling components based on the identified constraints.

20. The one or more non-transitory computer-readable media of claim 15, wherein translating the second logical form into a third natural language utterance comprises:
converting the second logical form into a logical form structure comprising one or more logical form statements, wherein the converting comprises extracting one or more operations and associated one or more attributes from the second logical form and generating the one or more logical form statements from the one or more operations and associated one or more attributes;
translating each of the one or more logical form statements into a natural language expression based on the grammar data structure;
combining the one or more natural language expressions into the third natural language utterance; and
providing the third natural language utterance as an interpretation of the second logical form.

* * * * *